US011907251B2

(12) United States Patent
Chidambaran et al.

(10) Patent No.: US 11,907,251 B2
(45) Date of Patent: Feb. 20, 2024

(54) METHOD AND SYSTEM FOR IMPLEMENTING DISTRIBUTED LOBS

(71) Applicant: ORACLE INTERNATIONAL CORPORATION, Redwood Shores, CA (US)

(72) Inventors: Lakshminarayanan Chidambaran, Chennai (IN); Srividya Tata, Bangalore (IN); Geeta Arora, Union City, CA (US); Rajendra S. Pingte, Foster City, CA (US); Sneha Chandrababu, San Mateo, CA (US); Ramkrishan Kanodia, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 509 days.

(21) Appl. No.: 15/690,894

(22) Filed: Aug. 30, 2017

(65) Prior Publication Data
US 2018/0060362 A1 Mar. 1, 2018

Related U.S. Application Data

(60) Provisional application No. 62/381,389, filed on Aug. 30, 2016.

(51) Int. Cl.
*G06F 16/27* (2019.01)
*G06F 16/22* (2019.01)

(52) U.S. Cl.
CPC .......... *G06F 16/27* (2019.01); *G06F 16/2219* (2019.01); *G06F 16/2282* (2019.01)

(58) Field of Classification Search
CPC ... G06F 16/27; G06F 16/2282; G06F 16/2219
See application file for complete search history.

(56) References Cited

U.S. PATENT DOCUMENTS 5,890,160 A * 3/1999 Hembry ................ G06F 16/289
5,983,213 A * 11/1999 Nakano ............... G06F 16/2219
(Continued)

OTHER PUBLICATIONS

International Search Report for corresponding International Application No. PCT/US2017/049409 dated Nov. 20, 2017, 3 pages.
(Continued)

*Primary Examiner* — Mark D Featherstone
*Assistant Examiner* — Tony Wu
(74) *Attorney, Agent, or Firm* — Vista IP Law Group, LLP

(57) ABSTRACT

Upon receiving a query at a local database server from a client directed to a LOB stored at a remote database server, a remote LOB locator is created comprising a local LOB locator indicating the LOB's location and a database link associated with the remote database server. The remote LOB locator is communicated to the client, which submits a request to the local database server to perform an operation directed to the LOB. The request is forwarded to the remote database server using the remote LOB locator, where the operation is performed. This mechanism is extended to work with sharded databases. Character set conversions are minimized when returning data to the client from the remote database server. Remote LOB locators may serve as bind variables for DML statements directed to local or remote tables. Local LOB locators may serve as bind variables for DML statements directed to remote tables.

51 Claims, 32 Drawing Sheets

(56) References Cited

U.S. PATENT DOCUMENTS

| | | | |
|---|---|---|---|
| 5,999,943 A * | 12/1999 | Nori | G06F 16/24562 |
| 6,012,067 A | 1/2000 | Sarkar | |
| 6,061,678 A | 5/2000 | Klein et al. | |
| 6,418,454 B1 * | 7/2002 | Toohey | G06F 16/2219 |
| 6,738,790 B1 | 5/2004 | Klein et al. | |
| 6,996,615 B1 * | 2/2006 | McGuire | H04L 67/1008 |
| | | | 709/224 |
| 2003/0023617 A1 * | 1/2003 | Hunt | G06F 16/289 |
| 2004/0167879 A1 * | 8/2004 | Cotner | G06F 16/2219 |
| 2004/0193608 A1 * | 9/2004 | Gollapudi | G06F 16/256 |
| 2006/0265414 A1 * | 11/2006 | Loaiza | G06F 16/2343 |
| 2007/0130118 A1 | 6/2007 | Ganduri et al. | |
| 2008/0098041 A1 | 4/2008 | Chidambaran et al. | |
| 2009/0024578 A1 * | 1/2009 | Wang | G06F 16/235 |
| 2009/0037495 A1 * | 2/2009 | Kumar | G06F 16/24552 |
| 2009/0097995 A1 * | 4/2009 | Ham | A61M 5/14216 |
| | | | 417/419 |
| 2012/0054197 A1 * | 3/2012 | San Martin | G06F 16/24554 |
| | | | 707/747 |
| 2012/0173919 A1 * | 7/2012 | Patel | G06F 12/0808 |
| | | | 714/4.11 |
| 2012/0259894 A1 * | 10/2012 | Varley | G06F 16/93 |
| | | | 707/795 |
| 2014/0237067 A1 | 8/2014 | Todd | |
| 2014/0280373 A1 * | 9/2014 | Raitto | G06F 16/27 |
| | | | 707/803 |
| 2014/0372702 A1 | 12/2014 | Subramanyam et al. | |
| 2016/0132558 A1 * | 5/2016 | Konik | G06F 16/24539 |
| | | | 707/717 |
| 2018/0013692 A1 * | 1/2018 | Park | H04L 67/22 |
| 2019/0220454 A1 * | 7/2019 | Matsui | H04L 12/46 |

OTHER PUBLICATIONS

Written Opinion of the International Searching Authority for corresponding International Application No. PCT/US2017/049409 dated Nov. 20, 2017, 13 pages.

Abbas, Abu Fazal. "When You Treat Clob as String" Mar. 5, 2016 from http://www.oraclebuffer.com/oracle/ora-22992-ora-64202-when-you-treat-clob-as-string/.

IMB Knowledge center, "Improving Performance for Applications That Access Distributed Data", from http://www.ibm.com/support/knowledgecenter/en/SSEPEK_11.0.0/intro/src/tpc/db2z_distributeddata.html.

IBM knowledge center, "Distributed Data" from http://www.ibm.com/support/knowledgecenter/SSEPEK_11.0.0/perf/src/tpc/db2z_tunedistributedapps.html.

* cited by examiner

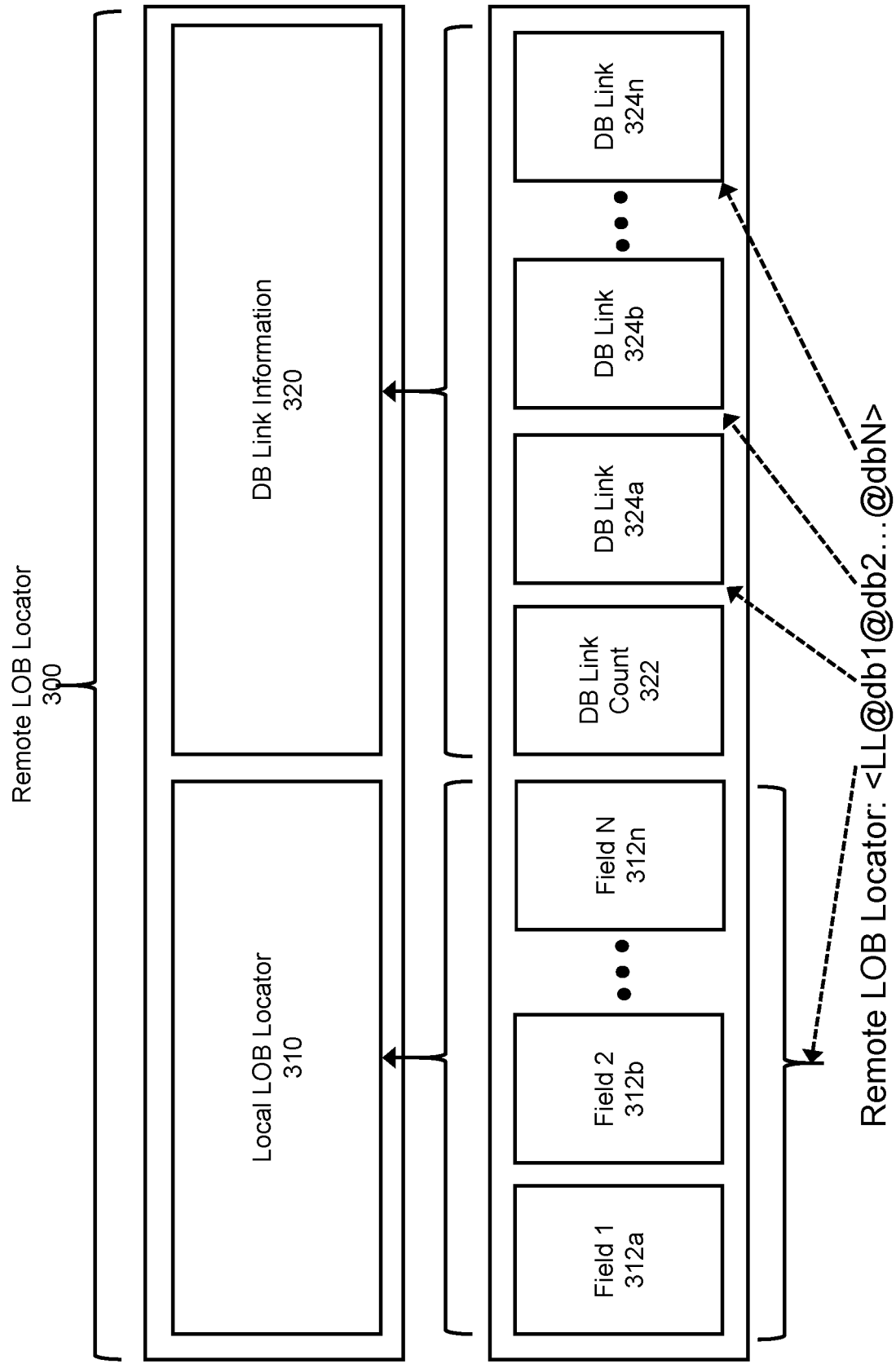

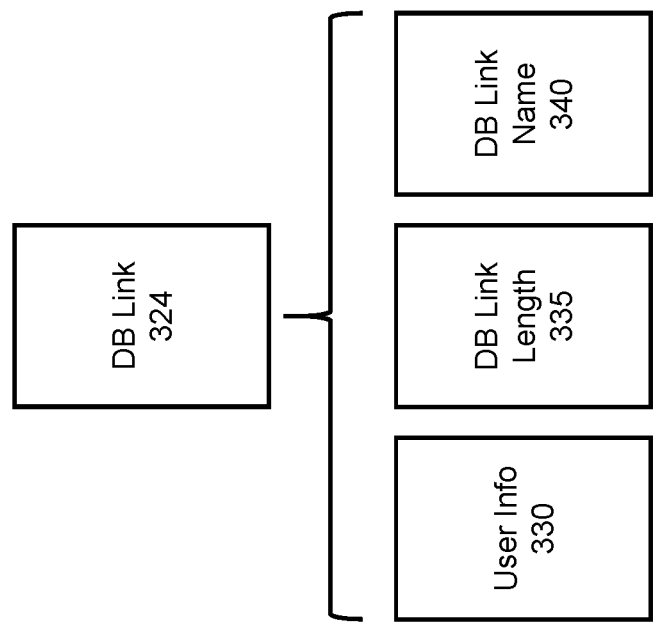

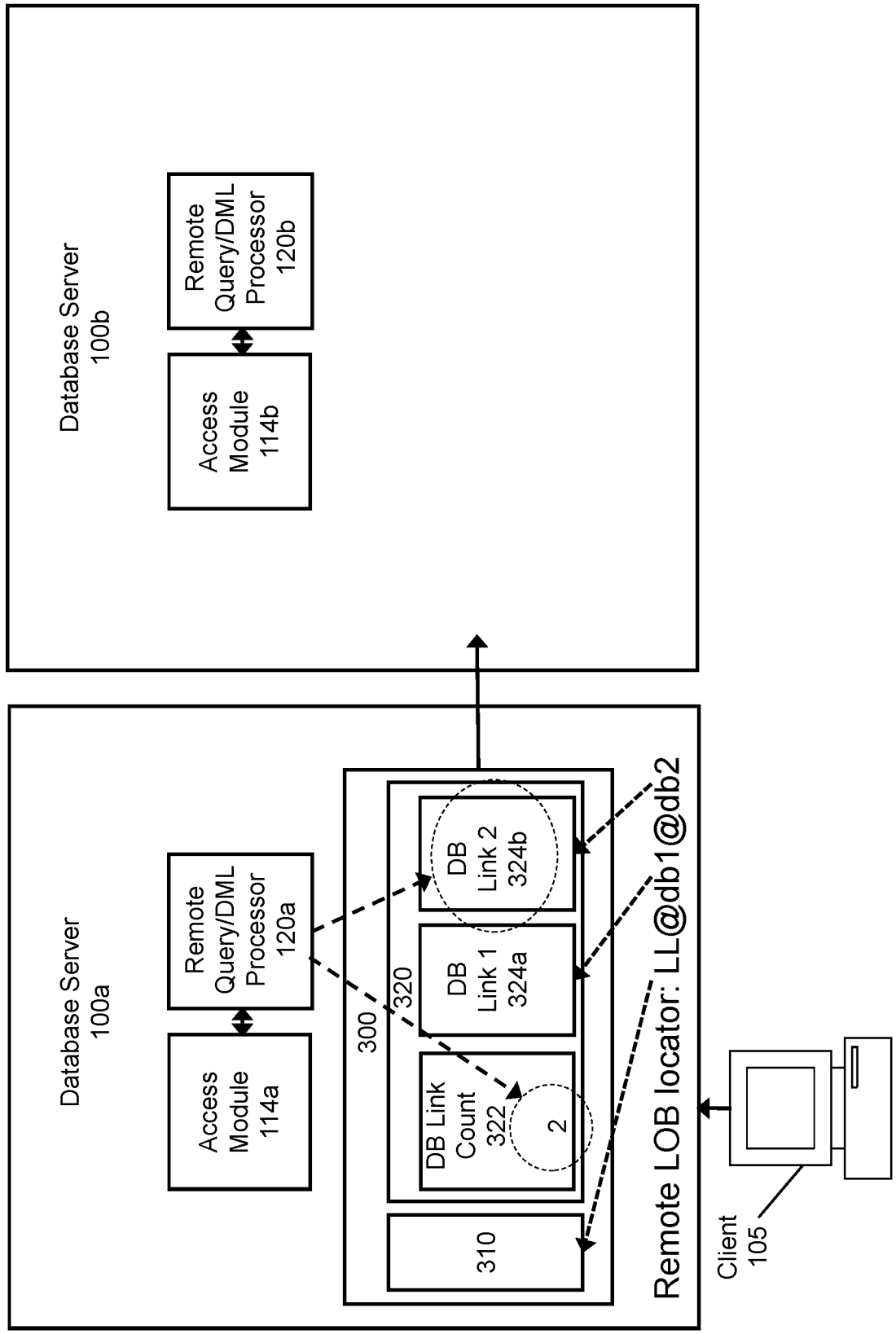

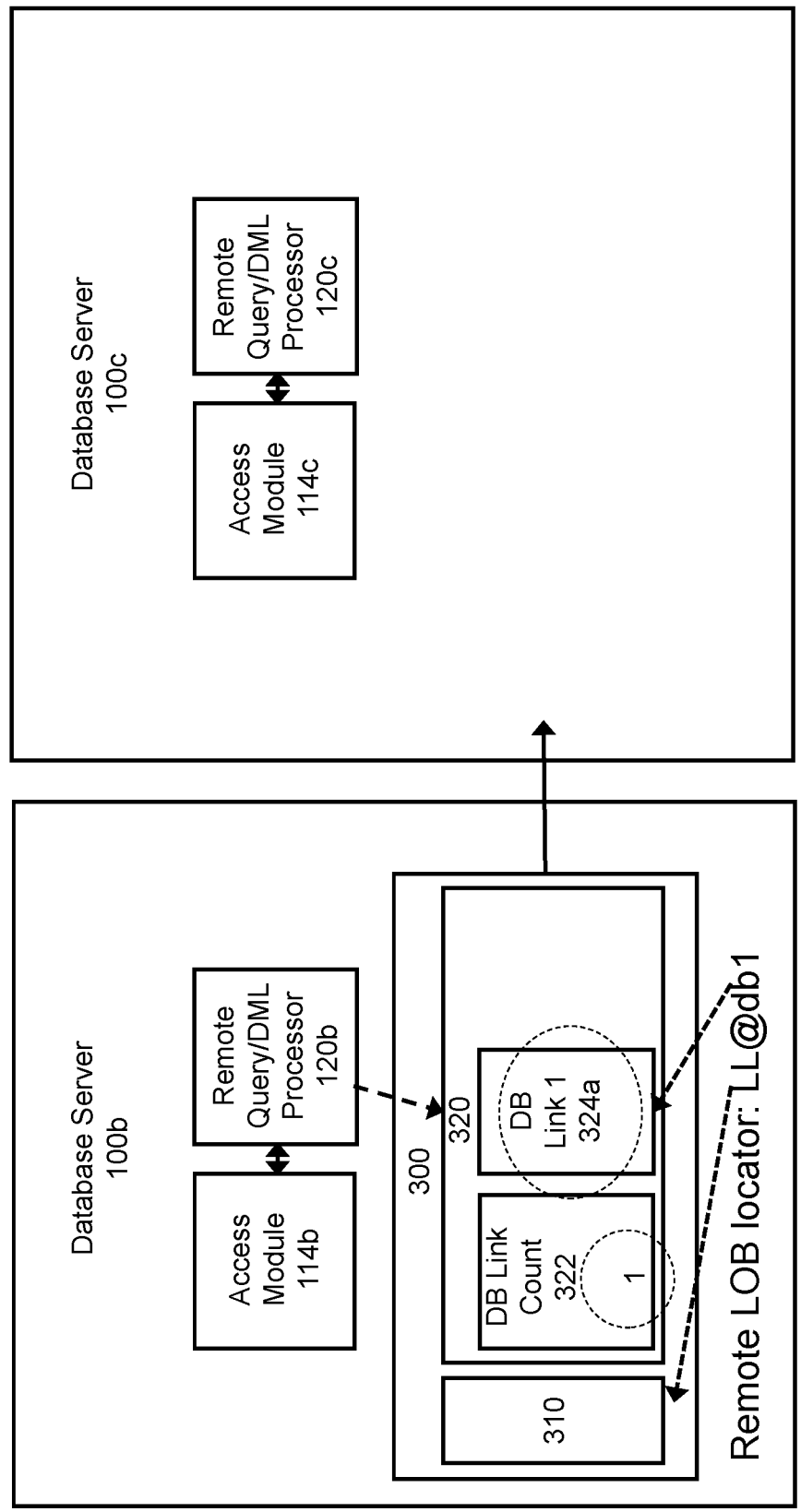

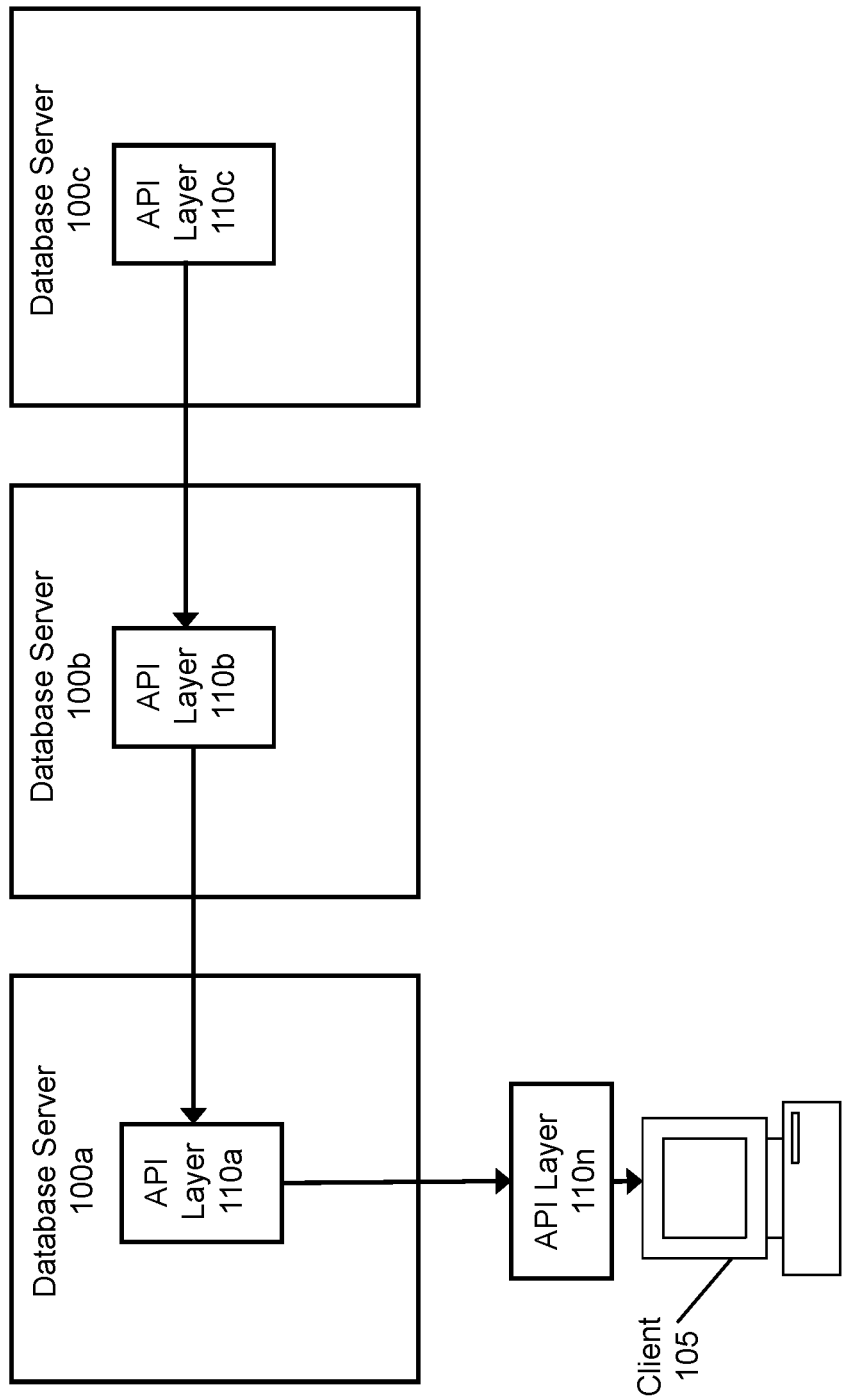

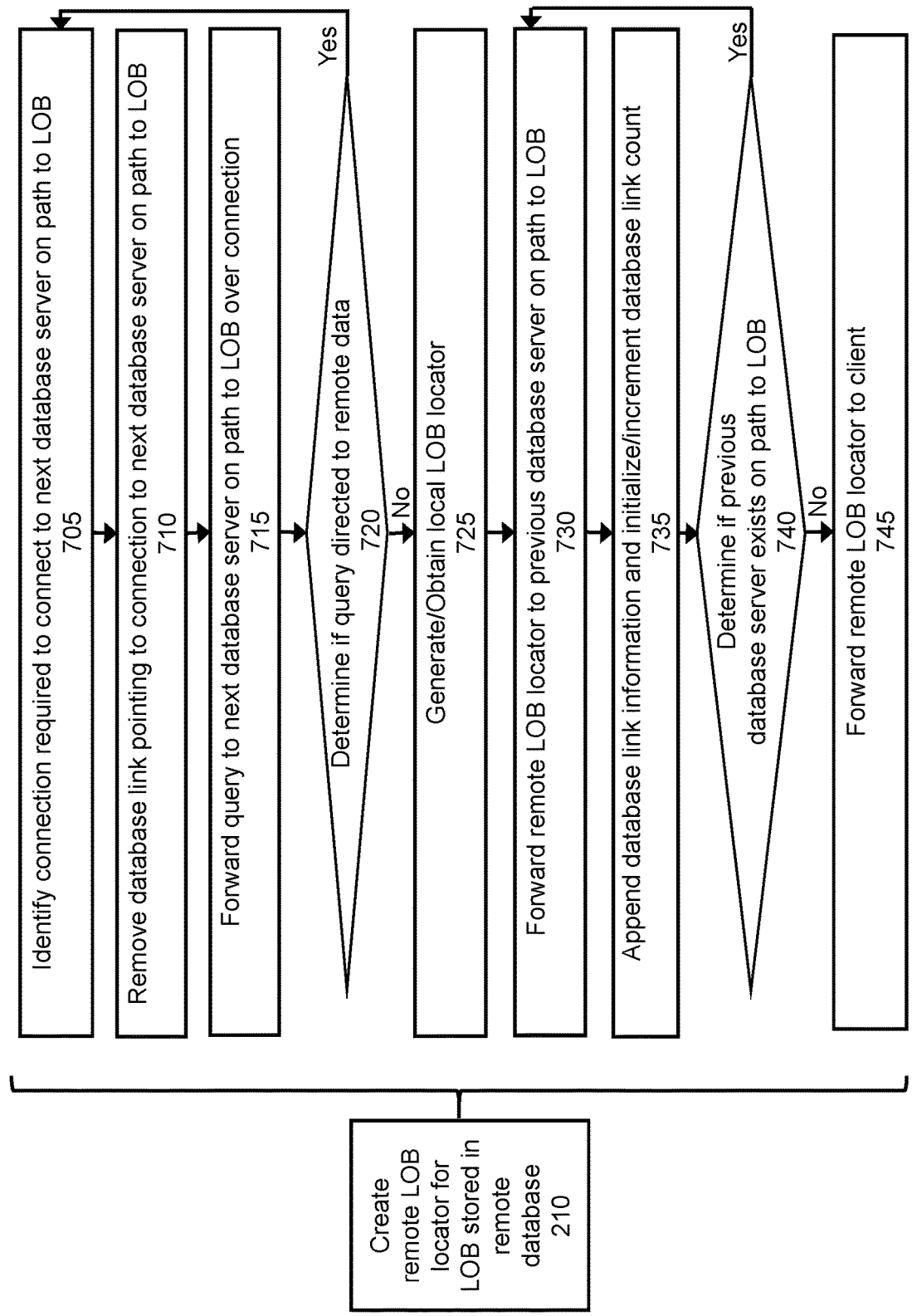

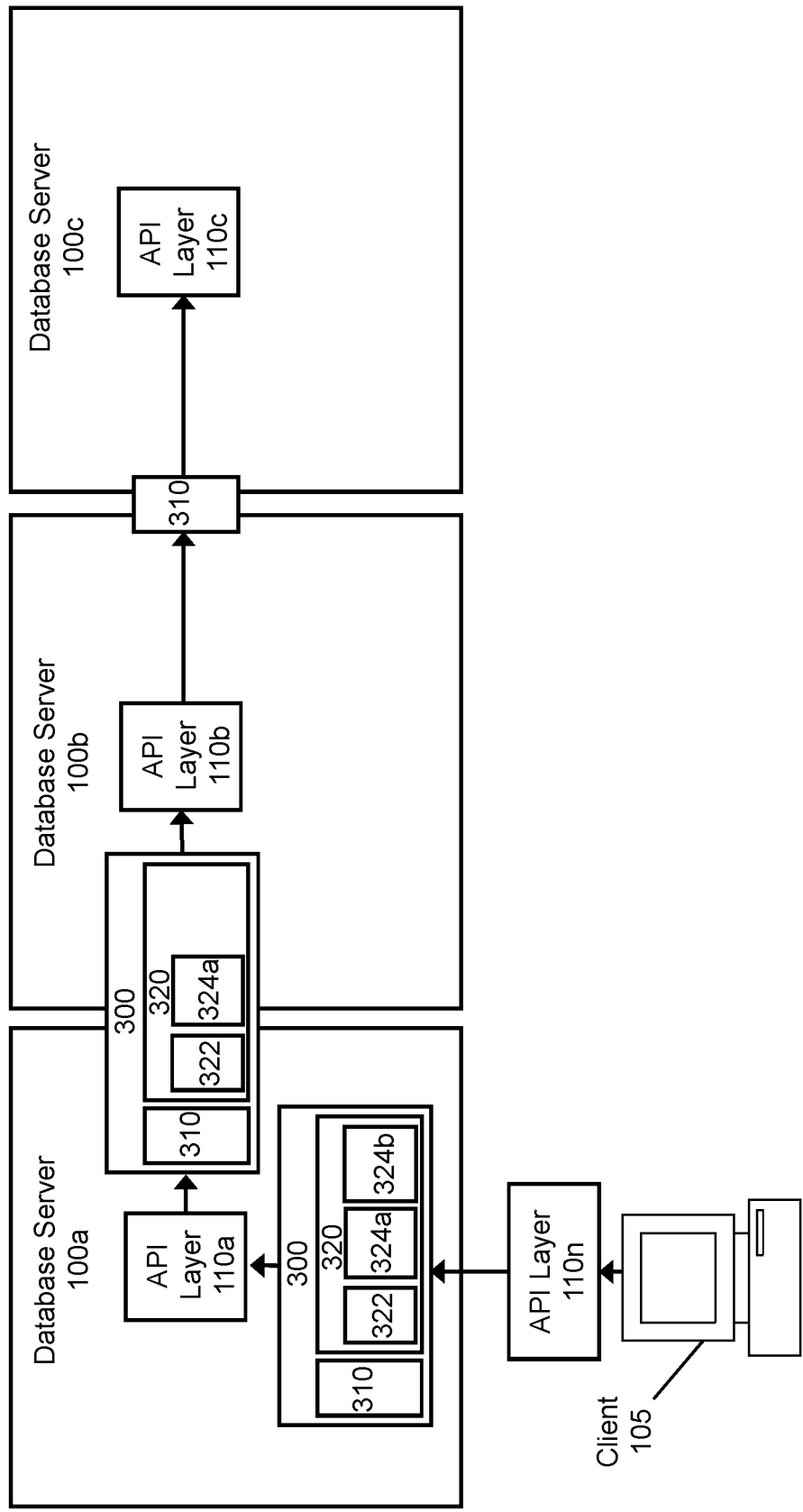

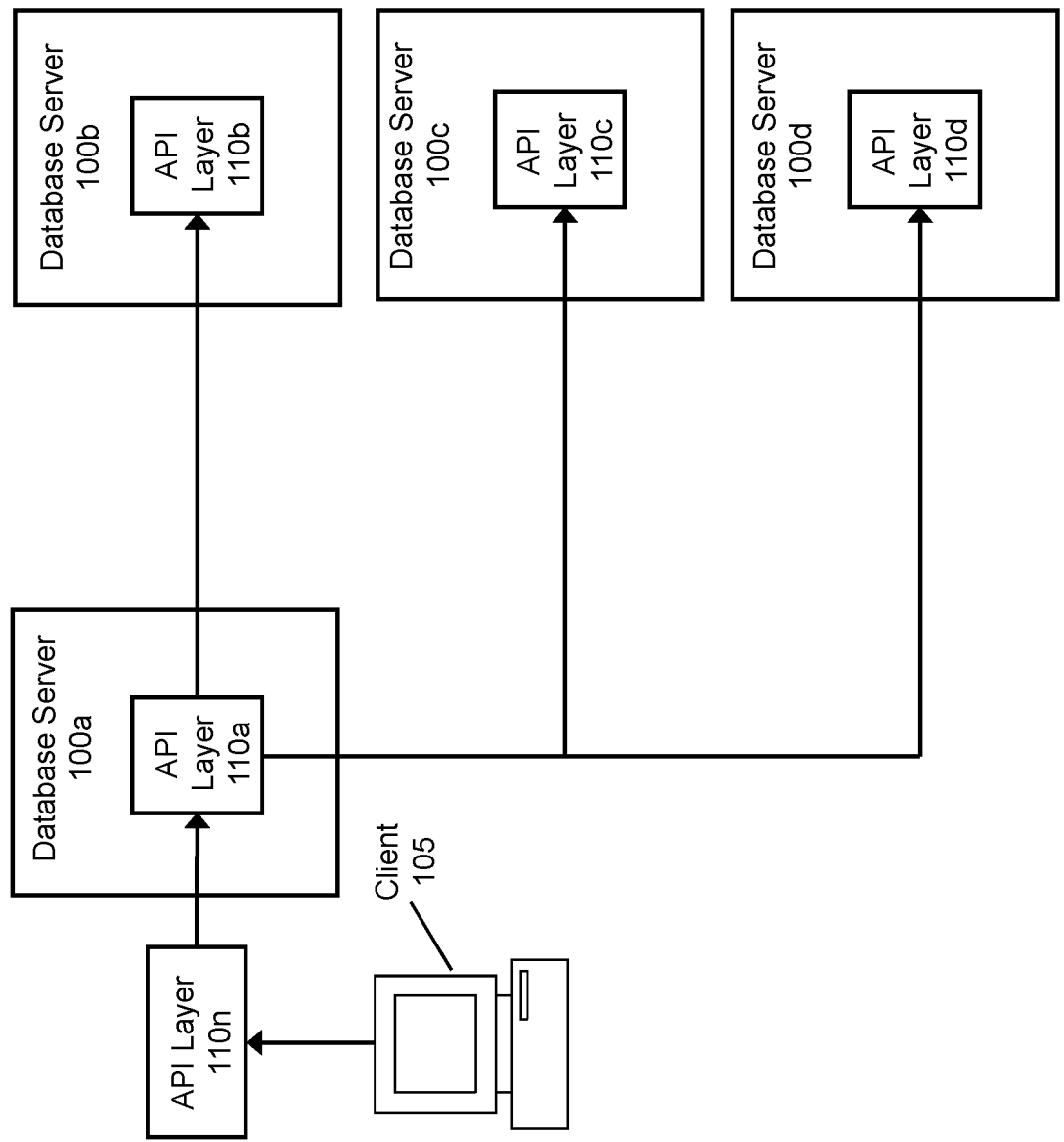

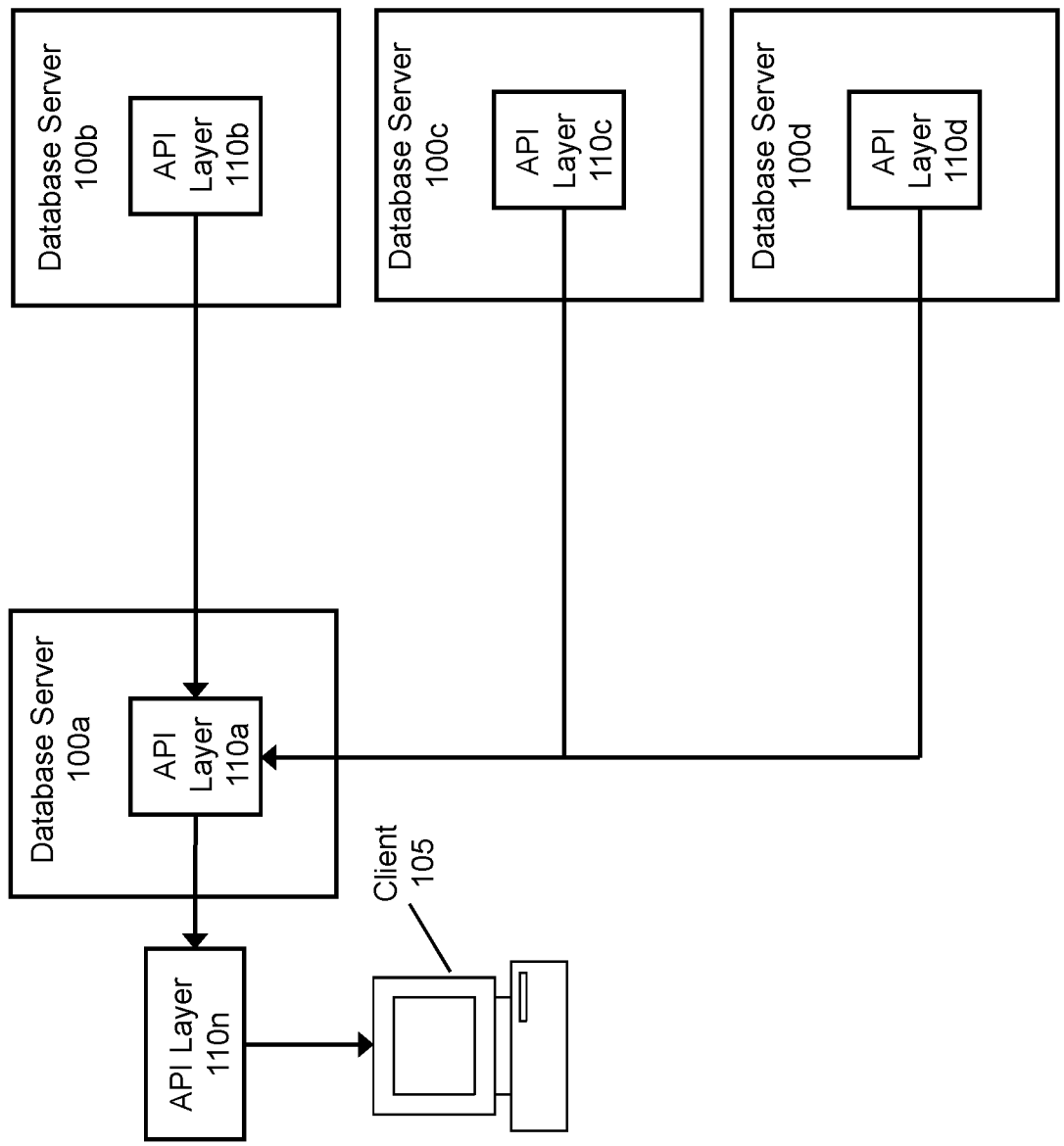

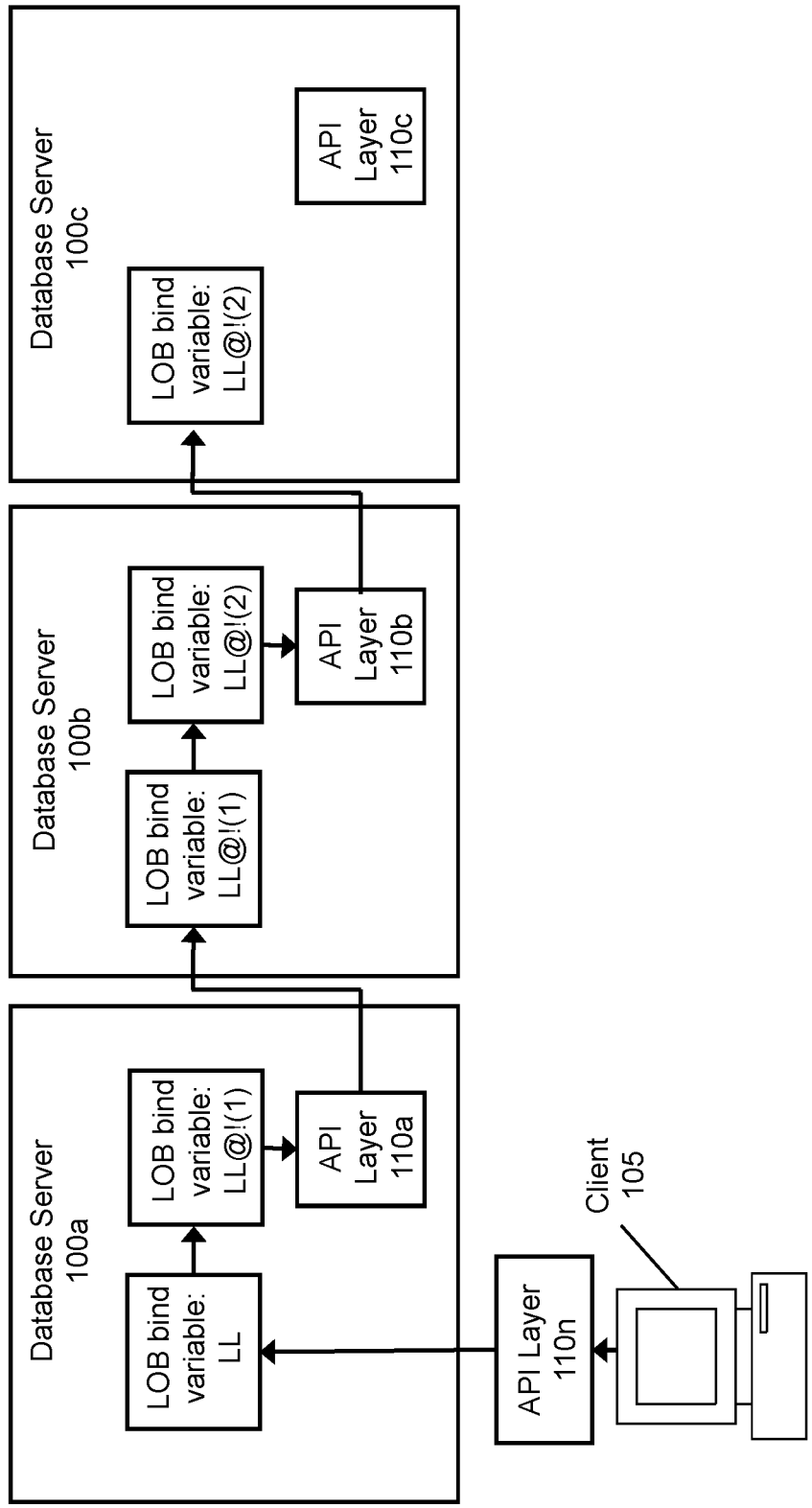

METHOD AND SYSTEM FOR IMPLEMENTING DISTRIBUTED LOBS

RELATED APPLICATION

This application claims the benefit of U.S. Provisional Application No. 62/381,389 titled "METHOD AND SYSTEM FOR IMPLEMENTING DISTRIBUTED LOBs", filed Aug. 30, 2016, which is incorporated herein by reference in its entirety.

FIELD

This disclosure concerns a method, a computer program product, and a computer system for implementing the Large Object data type in a distributed database system.

BACKGROUND

A distributed database system allows an application running on a client (e.g., a workstation, a personal computer, or a remote computing terminal) to access data stored in local databases and remote databases located at multiple database servers. Database servers in the distributed database system may be interconnected by a network. This network may also connect one or more clients to the database servers, allowing the clients to submit queries and requests to perform operations on the data stored at the database servers via the network. A client that is directly connected to a database server (i.e., a "local database server") may access data stored at a different database server (i.e., a "remote database server") via a database link that connects the local database server to the remote database server, allowing the client to access local databases and remote databases as one logical database. Therefore, even though a distributed database may be a set of databases located at multiple database servers, the data stored in the set of databases appear to an end user as though they are stored in a single database. Thus, database links create location transparency, which is a desirable property to have in distributed database systems since it simplifies access to data regardless of where the data is stored.

There are several advantages to storing data in distributed database systems rather than in centralized database systems. One such advantage provided by distributed database systems is fault tolerance. For example, since data stored in a distributed database is distributed across several database servers, in the event that a single database server fails, the distributed database system may continue to function since data may be accessed via other database servers in the network. An additional advantage of distributed database systems is improved performance. For example, if clients that need to access data are spread across different geographic regions, latency is reduced if requests from clients are fulfilled by database servers that are geographically closest to the clients rather than by a centralized database that may be geographically close to some, but not all clients. As an additional example, if a database server is slow or down, a different database server may be able to fulfill a client's request sooner than the database server that was slow or down would otherwise be able to fulfill the request. Yet another advantage of distributed database systems over centralized database systems is cost reduction. For example, it is often more cost-effective to purchase several smaller database servers with the equivalent power of a mainframe database server than it is to purchase the mainframe database server. Moreover, distributed database systems allow for modular growth, making them easier to maintain than centralized database systems. For example, although the functioning of a centralized database system is interrupted when processing and storage power are added, new database servers may be added to a distributed database system without interrupting the ability of the existing database servers to handle client requests.

The Large Object (LOB) data type is a data type used to store large amounts of data in databases. One type of LOB is the Binary Large Object (BLOB) data type, which is used to store large amounts of binary data. Examples of BLOBs include images, audio and video files, and other multimedia objects. Another type of LOB is the Character Large Object (CLOB) data type, which is used to store large amounts of character data. Examples of CLOBs include deeds, documents, books, JSON objects, etc. The LOB data type is preferable over other data types for the storage of large amounts of data due to its larger storage capacity. For example, LOBs can store 4 GB of data or more while LONG and LONG RAW data types are limited to 2 GB of data.

However, despite the advantages provided by distributed database systems and the LOB data type, manipulation of LOB data stored in a remote database is often limited. For example, random access of LOB data and updates to LOB data at a given offset are not supported for LOB data stored in remote databases. Furthermore, approaches that work around these limitations are inconvenient and inefficient because they often involve moving or copying entire columns of LOB data from remote databases to local databases.

Therefore, there is a need for an improved approach to randomly access LOBs and to update LOBs at any given offset in situations in which the LOBs are stored in remote databases.

SUMMARY

Embodiments of the present invention provide a method, a computer program product, and a computer system for implementing the Large Object (LOB) data type in a distributed database system.

According to some embodiments, a distributed database system that includes a client, a local database server, and a remote database server is implemented to perform operations on LOBs in the distributed database system. The local database may receive a query from the client directed to a LOB column of a table stored in a remote database at the remote database server. A remote LOB locator may then be created that includes a local LOB locator that points to a location in the remote database at which the LOB is stored and a database link associated with the remote database that is appended to the local LOB locator. Once created, the remote LOB locator may be communicated to the client. The local database server may then receive a request from the client to perform an operation directed to the LOB, in which the request includes the remote LOB locator. The request to perform the operation is then forwarded to the remote database server based at least in part on the remote LOB locator, where the operation specified in the request may be performed on the LOB.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3A is a diagram illustrating a remote LOB locator according to some embodiments of the invention.

FIG. 3B is a diagram illustrating a database link according to some embodiments of the invention.

FIGS. 5A-5E illustrate an example of processing a request directed to a LOB stored in a remote database according to some embodiments of the invention.

FIG. 5F illustrates an example of returning a result of a request directed to a LOB stored in a remote database to a client according to some embodiments of the invention.

FIG. 7 is a flow chart for creating a remote LOB locator for a LOB stored in a remote database according to some embodiments of the invention.

FIG. 8F illustrates an example of forwarding a request from a client to a remote database server using a remote LOB locator according to some embodiments of the invention.

FIG. 9A illustrates an example of forwarding a request to perform an operation directed to a LOB stored in a sharded database according to some embodiments of the invention.

FIG. 9B illustrates an example of returning a result of a request to perform an operation directed to a LOB stored in a sharded database to a client according to some embodiments of the invention.

FIG. 11D illustrates an example of forwarding a request to execute a DML statement directed to a remote table and specifying a LOB bind variable corresponding to a local LOB locator according to some embodiments of the invention.

DETAILED DESCRIPTION OF THE EMBODIMENTS OF THE INVENTION

Figure 1:
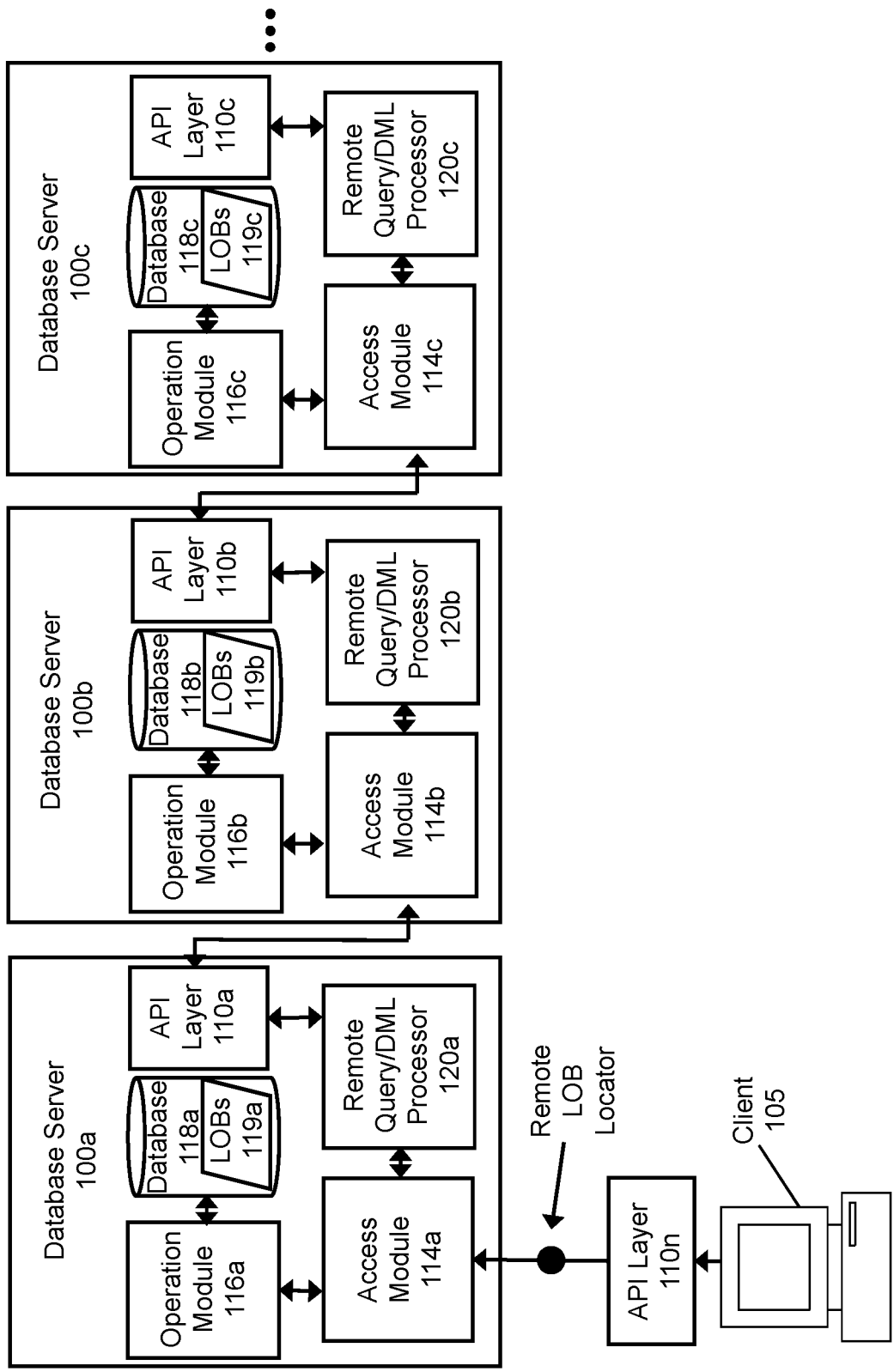
FIG. 1 illustrates a distributed database system in which some embodiments of the invention are implemented.

The present disclosure provides an improved approach for implementing the Large Object (LOB) data type in distributed databases.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Conventionally, database management systems or DBMSs (software used to control the storage, organization, and retrieval of data stored in databases), allow various types of operations to be performed on LOB data stored in a database. One type of operation that may be performed on LOB data stored in a local or a remote database is an SQL operation. For example, clients may issue requests to read or write an entire column of LOB data stored in a local or a remote database using SQL operations, such as SELECT, INSERT, or UPDATE. However, such operations are limited in their ability to manipulate LOBs because they do not allow for random access of data or updating of LOBs at a given offset. For example, such operations do not support read or write operations for a given number of characters or bytes from a specified location.

To address this issue, LOB locators, which can be thought of as pointers to the actual locations of LOB values, may be used to randomly access data or update LOBs at a given offset. For example, to access or manipulate a LOB, a LOB locator can be passed to a LOB API. In this example, by using a LOB locator, operations may be performed on the LOB at any given offset (e.g., data may be read from the LOB at a specific offset or written to the LOB at a specific offset).

However, conventional DBMSs only support the use of LOB locators in situations in which the LOBs are stored in local databases. Therefore, random access of LOBs and updates to LOBs at a given offset are not supported by conventional DBMSs for LOBs stored in remote databases, which breaks location transparency. Failing to support the use of LOB locators for LOBs stored in remote databases poses additional problems as well. For example, a growing trend for storing large datasets is to shard databases (i.e., to horizontally partition data in a row of a table across multiple databases), which allows database systems to be scaled horizontally with cheaper hardware and may improve performance by moving data geographically closer to the clients using the data. However, LOB locators for LOBs stored in local databases that were once supported by DBMSs may no longer be supported if the local databases are sharded. As an additional example, in an environment in which a standby or replica database is created and maintained to provide data protection and to increase the availability of data stored in a primary database (e.g., for read operations), if an application issues a write operation to the standby database using a LOB locator, since the write operation must be redirected to the primary database, the operation will fail.

One possible approach to get around the restriction on the use of LOB locators for LOBs stored in remote databases is to move or copy entire columns of LOBs from remote databases to local databases and then to perform the desired operations on the local databases using the LOB locators. However, this approach is inconvenient and inefficient, especially if the operations are to be performed on only a small amount of data since a large amount of data must first be moved to local databases in order to perform the operations.

This disclosure will now discuss an improved approach for implementing the LOB data type in distributed databases. In this approach, a local database may receive a query from a client directed to a LOB stored in a remote database. A remote LOB locator may then be created that includes a local LOB locator that points to a location in the remote database at which the LOB is stored and a database link associated with the remote database that is appended to the local LOB locator. This remote LOB locator may be communicated to the client, allowing the client to subsequently submit a request to perform an operation directed to the LOB to a local database server, in which the request includes the remote LOB locator. Using the remote LOB locator, the request to perform the operation is then forwarded to a remote database server at which the LOB is located, where the operation specified in the request may be performed on the LOB.

To demonstrate the improved approach for implementing the LOB data type in distributed databases, FIG. 1 illustrates a distributed database system in which some embodiments of the invention are implemented. In various embodiments, some aspects of the embodiments may be implemented separately or as a whole. For illustrative purposes, FIG. 1 shows a distributed database system including a client 105 connected to a chain of database servers 100, in which each of the database servers 100 includes a database 118. However, in various embodiments, a distributed database system may include more or fewer clients 105, database servers 100, and databases 118 than depicted in FIG. 1. Furthermore, in some embodiments, the client 105 and the database servers 100 may be connected in configurations other than those depicted in FIG. 1.

As shown in FIG. 1, a distributed database system may include several database servers 100 and a client 105. The client 105 is directly connected to a database server 100*a* and is indirectly connected to one or more additional database servers 100*b-c* via database server 100*a*. Due to their connections to the client 105, database server 100*a* may be referred to as a "local database server" 100*a*, while database servers 100*b-c* may be referred to as "remote database servers" 100*b-c* with respect to the client 105. Each database server 100 of the distributed database system may include various components that may be used to forward or process a query or a request originating from the client 105.

In some embodiments, each database server 100 may receive queries/requests originating from the client 105 to perform various operations on data stored in databases 118 at the database servers 100. A query/request to perform an operation may be directed to data (e.g., a LOB 119) stored in a database 118 at the same database server 100 at which the query/request has been received (i.e., "local data" stored in a "local database" 118), or to data stored in a database 118 at a different database server 100 (i.e., "remote data" stored in a "remote database" 118). Each database server 100 may include an operation module 116 that may be used to query a local database 118 or to perform various operations on data stored in the local database 118. In some embodiments, the operation module 116 may generate or obtain a local LOB locator that points to the location at which a LOB 119 is stored in a particular database 118.

In some embodiments, each database server 100 may include an access module 114 and a remote query/DML processor 120. The access module 114 receives a query or a request to perform an operation directed to data stored in a database 118 at one or more of the database servers 100 and may determine whether the query or request is directed to local data or to remote data. If the access module 114 determines that the query or request is directed to local data, the access module 114 may forward the query or request to perform the operation to the operation module 116, which may then query the local database 118 or perform the operation on the local database 118. Alternatively, if the access module 114 determines that the query or request is directed to remote data, the access module 114 forwards the query or request to perform the operation to the remote query/DML processor 120. The remote query/DML processor 120 may then forward the query or request to a database server 100 at which the data is stored or to a database server 100 that is on a path to the database server 100 at which the data is stored. Once the query or request is forwarded to the database server 100 at which the data is stored, the access module 114 at that database server 100 may forward the query or request to perform the operation to the operation module 116 at that database server 100 so that it may query a local database 118 or perform the operation on the local database 118.

The client 105, as well as each database server 100, may include an API layer 110, which provides various communication layers required for the client 105 to interact with a database server 100 and for the database servers 100 to interact with each other. For example, the client 105 may use a client application layer such as Oracle Call Interface (OCI), which provides an interface between a client application and SQL and allows the client 105 to interact with the local database server 100*a*. As an additional example, a presentation layer, such as Two-Task Common (TTC) may be used to resolve character set differences that may arise if the client 105 and a database server 100 run on different operating systems.

To illustrate an example of how the components of the database servers 100 of the distributed database system shown in FIG. 1 may be used to forward or process a query or a request originating from the client 105, suppose the access module 114*a* at the local database server 100*a* receives a request from the client 105 to perform an operation on data stored in a database 118. If the access module 114*a* determines that the request is directed to remote data, the access module 114*a* forwards the request to perform the operation to the remote query/DML processor 120*a*. In this example, the remote query/DML processor 120*a* may then forward the request to remote database server 100*b* via the API layer 110*a* at the local database server 100*a*. The access module 114*b* at database server 100*b* then receives the request to perform the operation and may determine whether the operation is directed to local data or to remote data. If the access module 114*b* determines that the request to perform the operation is directed to remote data, the access module 114*b* forwards the request to perform the operation to the remote query/DML processor 120*b*, which may then forward the request to database server 100*c* via the API layer 110*b* at database server 100*b*. The access module 114*c* at database server 100*c* then receives the request to perform the operation and may determine whether the operation is directed to local data or to remote data. If the access module 114*c* determines that the request to perform the operation is directed to local data, the access module 114*c* forwards the request to perform the operation to the operation module 116*c*, which may then perform the operation on the local database 118*c*.

The access module 114 at a database server 100 may determine whether a query or request to perform an operation is directed to data stored in a local database 118 or to data stored in a remote database 118 based on the presence or absence of a database link included in the query or request. A database link is a schema object in a database 118 that points to information about how to connect to a remote database server 100 and allows objects stored in a database 118 at the remote database server 100 to be accessed by specifying information identifying the remote database server 100 at which the database 118 is located, the port number and credentials to be used to connect to the remote database server 100, etc. Furthermore, a database link refers to a connection between two database servers 100, which allows the client 105 to access databases 118 at both database servers 100 as a single logical database 118. Based on the connection to which a database link refers, the remote query/DML processor 120 at a database server 100 may identify the remote database server 100 to which a query or request should be forwarded (e.g., by consulting a repository of information, such as a data dictionary stored at the database server 100, to retrieve information about how to connect to the remote database server 100 based on the database link).

In some embodiments, to increase the efficiency with which database servers 100 are connected, the remote query/DML processor 120 will first access a connection pool to determine whether a connection to a particular remote database server 100 exists before forwarding a query or request to the remote database server 100. If the remote query/DML processor 120 identifies an existing connection to the remote database server 100 in the connection pool, this connection is used to connect to the remote database server 100; otherwise, the remote query/DML processor 120 opens a new connection that is used to connect to the remote database server 100. This prevents connections from being repeatedly opened and closed. A query or request may then be forwarded to the remote database server 100 over the connection.

The access module 114 at a database server 100 may determine whether a query or a request originating from the client 105 includes a database link based on a special character included in the query, such as an "@" symbol. For example, suppose the following query is received from the client 105 by the access module 114*a* at the local database server 100*a*: "SELECT * FROM table_name;" In this example, the query does not include a database link. Therefore, the query is directed to data stored in a local database 118*a* and the access module 114*a* will forward the query to the operation module 116*a*, which may then query the local database 118*a*.

In contrast, suppose the following query is received from the client 105 by the access module 114*a* at the local database server 100*a*: "SELECT * FROM table_name@db1;" In this example, since the query includes a database link ("db1"), indicated by "@," the query is directed to data stored in a remote database 118. Assuming that the database link "db1" refers to a connection between database server 100*a* and database server 100*b*, the access module 114*a* will forward the query to the remote query/DML processor 120*a*, which may then forward the query to database server 100*b* via API layer 110*a*. In some embodiments, the remote query/DML processor 120*a* removes the database link before forwarding the query, such that the query received by database server 100*b* is: "SELECT * FROM table_name;" In this example, since the query that is received by the access module 114*b* at database server 100*b* does not include a database link, the query is directed to data stored in a local database 118*b*. Therefore, the access module 114*b* will forward the query to the operation module 116*b*, which may then query the local database 118*b* at which table_name is stored.

In some embodiments, a query or request to perform an operation is forwarded from the client 105 along a path of multiple database servers 100 to a remote database server 100 that stores data to which the query or request is directed. For example, suppose the following query is received by the access module 114*a* at the local database server 100*a* from the client 105: "SELECT * FROM table_name@db1@db2;" In this example, since the query includes at least one database link ("db1" and "db2"), the query is directed to data stored in a remote database 118. Therefore, the access module 114*a* at the local database server 100*a* will forward the query to the remote query/DML processor 120*a*, which may then forward the query to a remote database server 100.

In embodiments in which a query or request includes multiple database links, the remote query/DML processor 120 may identify the database server 100 to which the query or request should be forwarded based on the order in which the database links are appended (e.g., based on the last database link appended). In the above example, the remote query/DML processor 120*a* may examine the last database link appended in the query (i.e., "db2") and identify the database server 100 to which the query should be forwarded based on this database link; assuming that the database link "db2" refers to a connection between database server 100*a* and database server 100*b*, the remote query/DML processor 120*a* will forward the query to access module 114*b* at remote database server 100*b* via API layer 110*a*. In some embodiments, the remote query/DML processor 120 removes the database link referring to the database server 100 to which a query or request will be forwarded before forwarding the query or request. For example, the remote query/DML processor 120*a* will forward query in the above example after removing the database link "db2" from the query, such that the access module 114*b* at database server 100*b* receives the following query: "SELECT * FROM table_name@db1;"

Continuing with the above example, since the query that is received by the access module 114*b* at database server 100*b* includes a database link ("db1"), the query is directed to data stored in a remote database (e.g., 118*c*). Assuming that the database link "db1" points to information about how to connect to database server 100*c*, the access module 114*b* will forward the query to the remote query/DML processor 120*b*, which may then forward the query to the access module 114*c* at database server 100*c* via API layer 110*b* after the remote query/DML processor 120*b* removes the database link "db1." Thus, the query received by the access module 114*c* at database server 100*c* is: "SELECT * FROM table_name;" In this example, since the query does not include a database link, the query is directed to data stored in a local database 118*c* and the access module 114*c* will forward the query to the operation module 116*c*, which may then query database 118*c*.

Once a query or a request to perform an operation is forwarded to a remote database server 100 that stores the data to which the query or request is directed and the operation module 116 queries a database 118 or performs the operation on a database 118 local to the database server 100, the results of the query or request may then be returned to the client 105. If a query or request to perform an operation is directed to data stored in a remote database 118 and the request is forwarded along a path of multiple database servers 100 to a remote database server 100 at which the data is stored, the results of the operation may be returned to the client 105 by traversing the same path, but in reverse. For example, if a request to perform a READ operation is directed to data stored in database 118*c* at database server 100*c* and was forwarded from the client 105 to database server 100*a*, which forwarded the request to database server 100*b*, which forwarded the request to database server 100*c*, the results of the operation may be forwarded from database server 100*c*, to database server 100*b*, to database server 100*a*, to the client 105.

Figure 2:
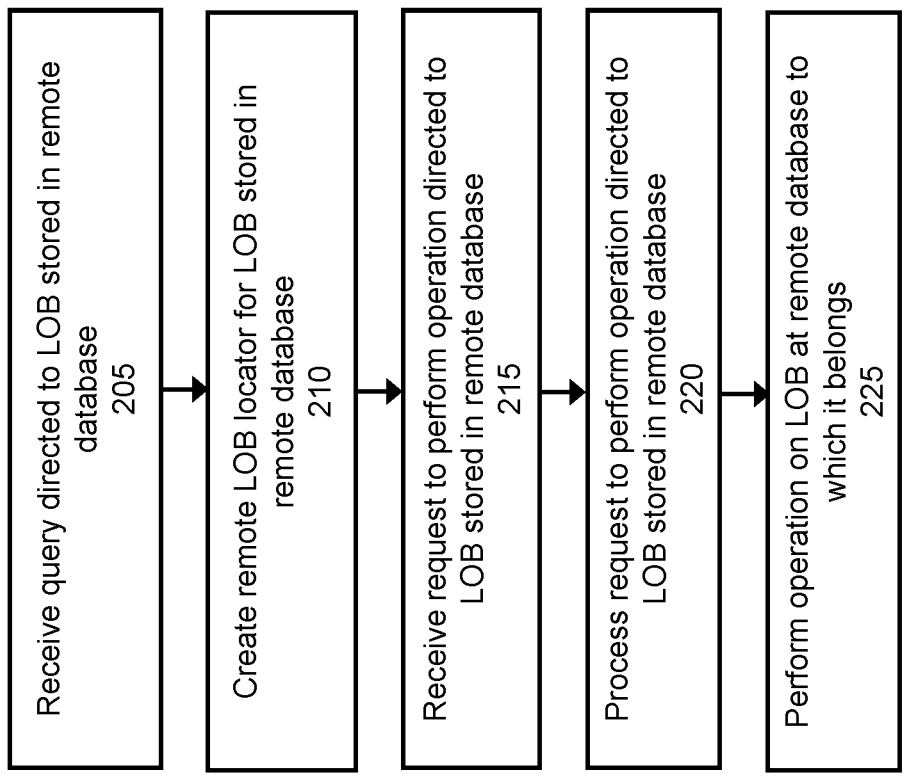
FIG. 2 is a flowchart for performing an operation on a LOB stored in a remote database using a remote LOB locator according to some embodiments of the invention.

FIG. 2 is a flowchart for performing an operation on a LOB stored in a remote database using a remote LOB locator according to some embodiments of the invention. Some of the steps illustrated in the flowchart are optional in different embodiments. In some embodiments, the steps may be performed in an order different from that described in FIG. 2.

The flowchart begins when the access module 114*a* at the local database server 100*a* receives 205 a query from the client 105 directed to a LOB 119 stored in a remote database 118. For example, suppose the access module 114*a* at the local database server 100*a* receives 205 the following query from an application running on the client 105: "SELECT Image FROM foo@db2;" where "Image" is a column containing LOB data in a table named "foo" and the database link "db2" refers to a connection between the local database server 100*a* and remote database server 100*b*.

Upon receiving 205 the query, the access module 114*a* at the local database server 100*a* may determine whether the query is directed to local data or to remote data based on the presence of a database link included in the query. In the above example, since the query includes a database link ("db2"), the access module 114*a* may determine that the operation is directed to data stored in a remote database 118. Alternatively, had the query in the above example not included a database link (i.e., "SELECT Image FROM foo;"), the access module 114*a* would have determined that the query was directed to data stored in a local database 118*a* and forwarded the query to the operation module 116*a*, which would query the local database 118*a*.

If the access module 114*a* determines that the query received 205 from the client 105 is directed to a LOB 119 stored in a remote database 118, a remote LOB locator may be created 210 for the LOB 119. The remote LOB locator is a pointer to the actual location at which the LOB 119 is stored. The remote LOB locator may be created 210 during the return of a result of the query to the client 105, such that the remote LOB locator, as well as the result of the query, may be returned together to the client 105. By returning the remote LOB locator to the client 105 in response to the query, the remote LOB locator may be used to perform subsequent requests issued by the client 105 to perform operations on the LOB 119 at given offsets.

As shown in FIG. 3A, a remote LOB locator 300 may include two portions. One of these portions is a local LOB locator 310 (generically represented as "LL") that points to a location at which a LOB 119 is stored in a particular database 118. In some embodiments, the local LOB locator 310 is created or obtained (e.g., by the operation module 116) at the database server 100 at which the LOB 119 is stored. The local LOB locator 310 may include several fields 312*a-n* that describe the LOB 119 and the location at which it is stored in a particular database 118 (e.g., the length of the LOB 119, its version, an identifier for the LOB 119, etc.).

The second portion of the remote LOB locator 300 is the database link information or "DB link information" 320, which may also include several portions, including a database link count or "DB link count" 322 and one or more database links or "DB links" 324*a-n* (generically represented as "db1"-"dbN"). The value stored in the database link count 322 indicates the number of database links 324 appended to the local LOB locator 310, while each database link 324 appended to the local LOB locator 310 points to information about how to connect to a remote database server 100. As illustrated in FIG. 3B, each database link 324 may include various fields that describe the database link 324, such as user information "user info" 330 that identifies an end user who issued a query or request originating from the client 105, a database link length or "DB link length" 335 that indicates the length of the information describing the database link 324, and a database link name or "DB link name" 340 that includes the name of the database link 324 used to connect to a remote database server 100.

Referring again to FIG. 3A, the order of the database links 324 included in the database link information 320 may indicate a path of database servers 100 that leads from a local database server 100 to a remote database server 100, in which the remote database server 100 stores a LOB 119 to which a query or a request received from a client 105 is directed. Furthermore, the value stored in the database link count 322 may indicate the number of remote database servers 100 that must be traversed to reach the LOB 119. For example, the first database link 324*a* (generically represented as "db1") appended to the local LOB locator 310 refers to a connection between a first remote database server 100 at which a LOB 119 is stored and a second remote database server 100; the second database link 324*b* (generically represented as "db2") refers to a connection between the second remote database server 100 and a third remote database server 100; etc. Additionally, in the previous example, the last database link 324*n* (generically represented as "dbN") appended to the local LOB locator 310 refers to a connection between a local database server 100*a* and a remote database server 100 along a path to the remote database server 100 at which the LOB 119 is stored. Thus, a general way of expressing the remote LOB locator 300 is "LL@db1@db2 . . . @dbN," where "LL" corresponds to the local LOB locator 310, "db1" corresponds to the connection to the remote database server 100 at which the LOB 119 is stored and "db2" through "dbN" correspond to connections to remote database servers 100 along the path from the local database server 100 to the remote database server 100 at which the LOB 119 is stored. Creation 210 of a remote LOB locator 300 for a LOB 119 stored in a remote database 118 is further described below in conjunction with FIGS. 7 and 8A-8F.

Referring back to FIG. 2, once the client 105 has received the remote LOB locator 300 created 210 for the LOB 119 stored in the remote database 118, the local database server 100*a* may subsequently receive 215 a request from the client 105 to perform an operation directed to the LOB 119 stored in the remote database 118. For example, the local database server 100*a* may receive 215 a request (e.g., a remote procedure call) from an application running on the client 105 to perform a read or a write operation that is directed to a remote LOB 119*c* stored at remote database server 100*c*, in which the request contains a remote LOB locator 300 for the LOB 119*c* (e.g., generically represented as "LL@db1@db2"). In various embodiments, the request to perform the operation may include different parameters based on the type of operation being requested. For example, the TRIM operation may include additional parameters specifying an offset, how much of the data to trim, etc. Examples of additional types of operations may include APPEND, COPY, ERASE, WRITEAPPEND, and COMPARE.

The database servers 100 may process 220 the request to perform the operation directed to the LOB 119 stored in the remote database 118 based at least in part on the remote LOB locator 300 for the LOB 119. In some embodiments, to process 220 the request, the local database server 100*a* may first determine whether the request is directed to local data or to remote data. Similar to the process described above with respect to the query, the access module 114*a* at the local database server 100*a* may determine whether the request is directed to local data or to remote data based on the presence of a database link 324 included in the request. In the above example, since the request includes at least one database link 324 ("db1" and "db2"), the access module 114 may determine that the operation is directed to data stored in a remote database 118.

Upon determining that the request received 215 from the client 105 is directed to a LOB 119 stored in a remote database 118, the access module 114*a* may forward the request to the remote query/DML processor 120*a*, which will forward the request to a remote database server 100 based on the remote LOB locator 300 for the LOB 119 contained in the request. In some embodiments, the remote query/DML processor 120*a* determines the remote database server 100 to which the request should be forwarded by examining the last database link 324 included in the remote LOB locator 300. For example, if the remote LOB locator 300 is represented generically as "LL@db1@db2," the remote query/DML processor 120*a* will examine the last database link 324 ("db2") to identify the remote database server 100 to which the request should be forwarded. Assuming that the database link 324 "db2" refers to a connection between database server 100*a* and database server 100*b*, the remote query/DML processor 120*a*, may forward the request to database server 100*b* via API layer 110*a*. Furthermore, assuming that the database link "db1" refers to a connection between database servers 100*b* and 100*c*, the remote query/DML processor 120*b* at database server 100*b* may repeat this process and forward the request to database server 100*c* via API layer 110*b*. Processing 220 a request to perform an operation directed to a remote LOB 119 is further described below in conjunction with FIGS. 4 and 5A-5F.

Once the request is received at the remote database server 100 at which the remote LOB 119 is stored, the access module 114 at the database server 100 may forward the request to perform the operation to the operation module 116 at the same database server 100, which may then perform 225 the operation on the LOB 119. The operation module 116 may perform 225 the operation (e.g., a read or write operation) directed to the LOB 119 identified by the local LOB locator 310 corresponding to "LL." In the above example, if the operation is a read operation, the operation module 116*c* may perform 225 the operation by reading the data identified by the local LOB locator 310. In this example, the data that is read may then be returned to the client 105 by hopping across the same set of database servers 100 used to forward the request from the client 105 to the remote database server 100*c* at which the remote LOB 119*c* is stored, but in reverse (e.g., from database server 100*c*, to database server 100*b*, to database server 100*a*, to the client 105). As an additional example, if the operation is a write operation, the operation module 116*c* at the remote database server 100*c* at which the remote LOB 119*c* is stored may perform 225 the operation by writing the data specified in the request to the location in the database 118*c* identified by the local LOB locator 310. In this example, information indicating whether the write operation was performed successfully may be returned to the client 105 (e.g., from database server 100*c*, to database server 100*b*, to database server 100*a*, to the client 105).

Figure 4:
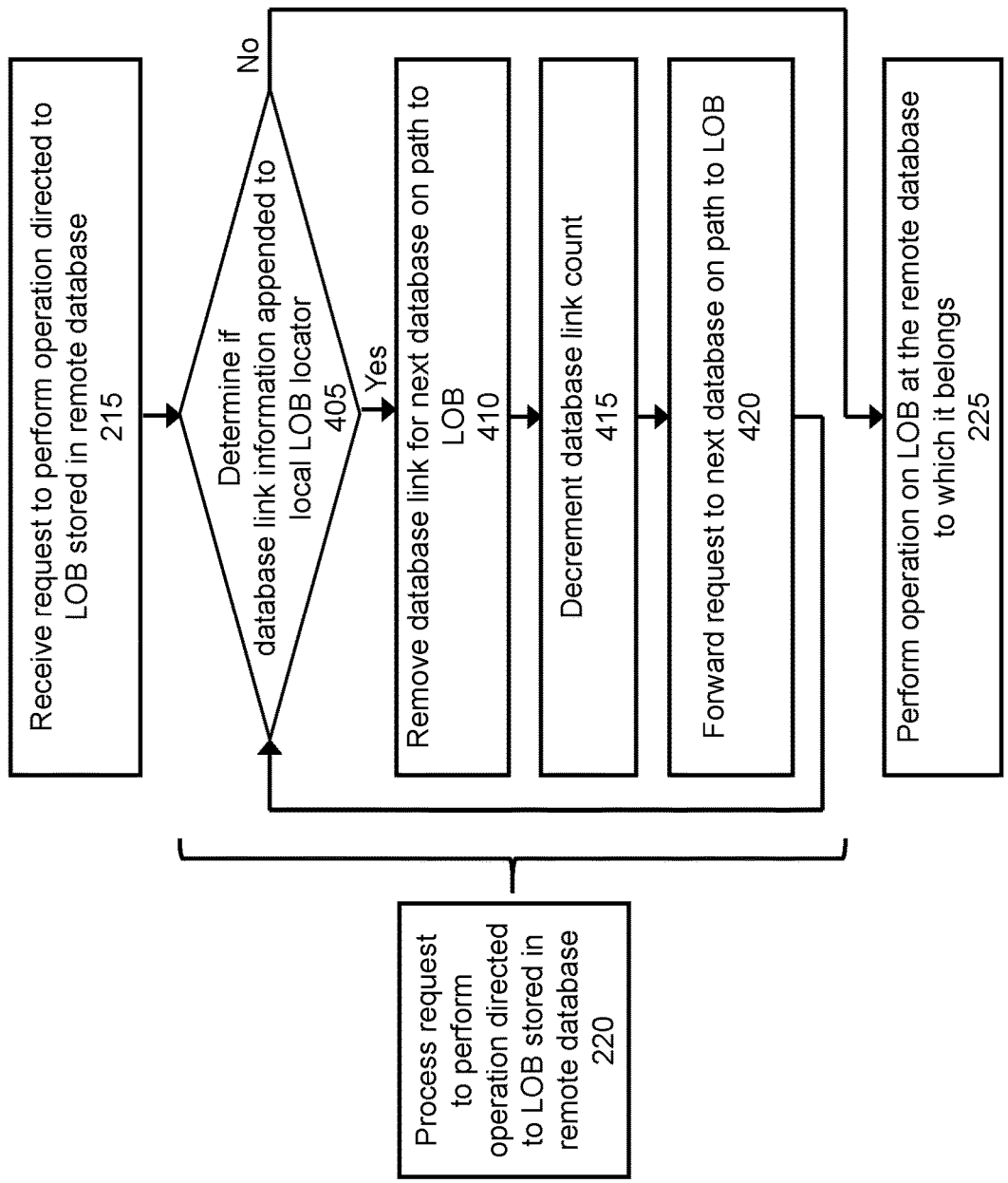
FIG. 4 is a flow chart for processing a request directed to a LOB stored in a remote database according to some embodiments of the invention.

FIG. 4 is a flow chart for processing a request directed to a LOB stored in a remote database according to some embodiments of the invention. Some of the steps illustrated in the flowchart are optional in different embodiments. In some embodiments, the steps may be performed in an order different from that described in FIG. 4.

The database servers 100 may process 220 the request to perform the operation directed to the LOB 119 stored in the remote database 118 based at least in part on the remote LOB locator 300 for the LOB 119. For example, suppose the request includes a remote LOB locator 300 that is generically represented as "LL@db1@db2." Upon receiving 215 the request from the client 105, the access module 114*a* at the local database server 100*a* may first determine whether the request is directed to local data or to remote data. The access module 114*a* may do so by determining 405 whether database link information 320 has been appended to the local LOB locator 310 included in the request. In the above example, since the request includes at least one database link 324 ("db1" and "db2"), the access module 114a may determine that the operation is directed to data stored in a remote database 118.

Upon determining that the request received 215 from the client 105 is directed to a LOB 119 stored in a remote database 118, the access module 114a may forward the request to the remote query/DML processor 120a, which will forward 420 the request to a remote database 118 based on the remote LOB locator 300 for the LOB 119 contained in the request. In some embodiments, the remote query/DML processor 120a identifies the remote database server 100 to which the request should be forwarded 420 by examining the last database link 324 included in the remote LOB locator 300. In the above example, since the remote LOB locator 300 is represented generically as "LL@db1@db2," the remote query/DML processor 120a will examine the last database link 324 ("db2") to identify the remote database server 100 to which the request should be forwarded 420 (e.g., by consulting a data dictionary stored at the database server 100a to retrieve information about how to connect to a remote database server 100 based on the database link 324 "db2").

Assuming that the database link 324 "db2" refers to a connection between database server 100a and database server 100b, the remote query/DML processor 120a, may forward 420 the request to database server 100b via API layer 110a. In some embodiments, the remote query/DML processor 120a will first access a connection pool to determine whether a connection to database server 100b exists—if the remote query/DML processor 120a identifies an existing connection to database server 100b in the connection pool, this connection is used to connect database server 100a and database server 100b; otherwise, the remote query/DML processor 120a opens a new connection that is used to connect the database servers 100a-b. The request is then forwarded 420 to database server 100b over the connection between the database servers 100a-b.

Figure 5B:
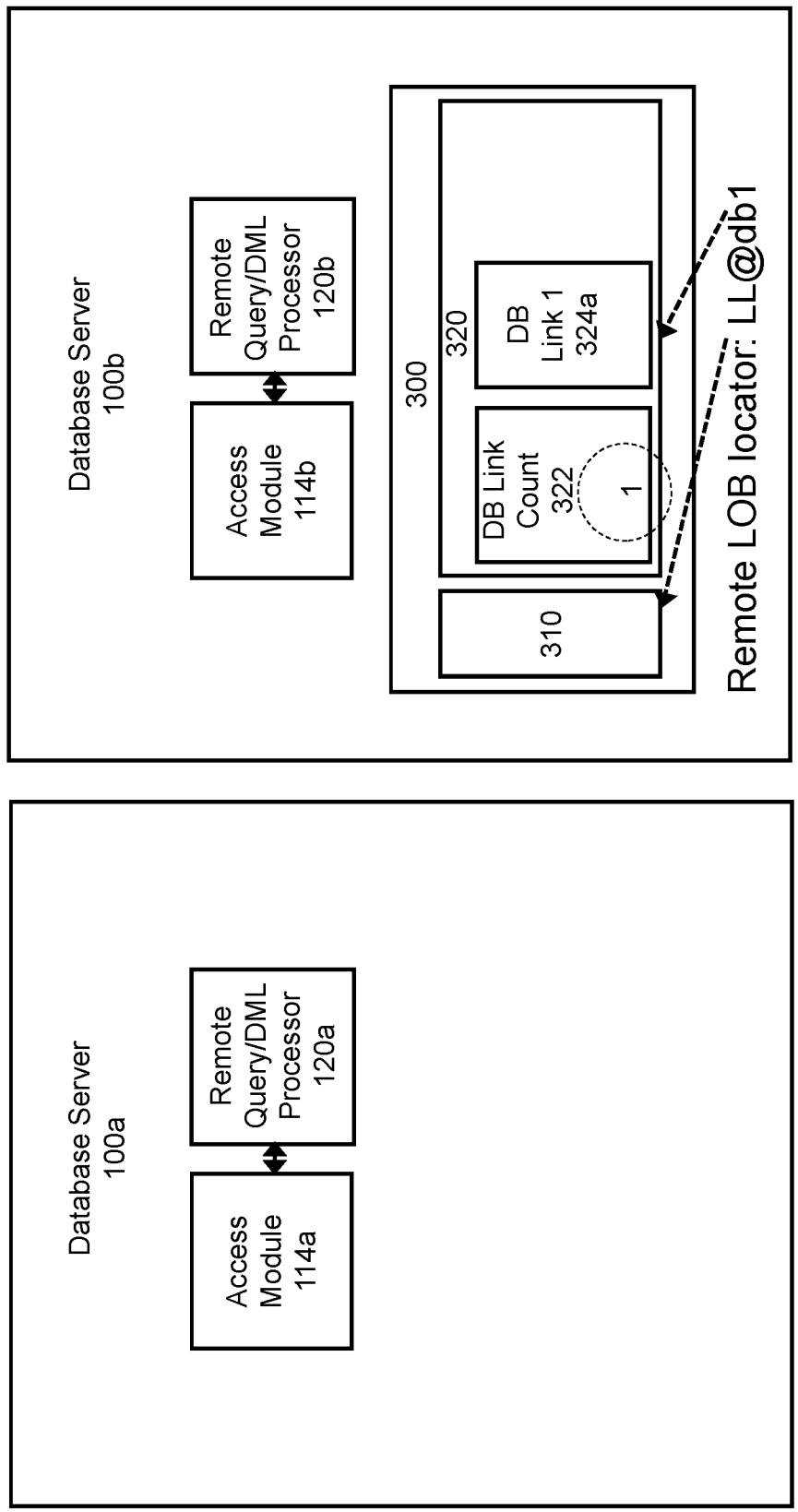

In some embodiments, before the request is forwarded 420 to database server 100b, the database link 324 which refers to the connection between database server 100a and database server 100b is removed 410. For example, as shown in FIGS. 5A and 5B, if the remote LOB locator 300 is represented generically as "LL@db1@db2," the database link 324b "db2" is removed 410 from the remote LOB locator 300. Furthermore, the database link count 322 may be decremented 415 by one when the database link 324b is removed 410. As illustrated in FIGS. 5A and 5B, the value of the database link count 322 is decremented 415 from 2 to 1 by the remote query/DML processor 120a before the remote LOB locator 300 is forwarded from database server 100a to database server 100b. Thus, as shown in FIG. 5B, when database server 100b receives the remote LOB locator 300, the remote LOB locator 300 is represented generically as "LL@db1" and the database link count 322 has a value of 1.

When the request is received at database server 100b, the access module 114b may determine whether the request is directed to local data or to remote data. As described above, the access module 114b may do so by determining 405 whether database link information 320 has been appended to the local LOB locator 310 included in the request. In the above example, since the request includes at least one database link 324a ("db1"), the access module 114b may determine that the operation is directed to data stored in a remote database 118.

Once the access module 114b has determined that the request is directed to data stored in a remote database 118, the access module 114b may forward the request to the remote query/DML processor 120b, which will forward 420 the request to a remote database server 100 based on the remote LOB locator 300 for the remote LOB 119 contained in the request. The remote query/DML processor 120b may identify the remote database server 100 to which the request should be forwarded 420 by examining the last database link 324 included in the remote LOB locator 300. Continuing with the previous example, since the remote LOB locator 300 is represented generically as "LL@db1," the remote query/DML processor 120b will examine the database link 324a "db1" to identify the remote database server 100 to which the request should be forwarded 420 (e.g., by consulting a data dictionary stored at the database server 100b to retrieve information about how to connect to a remote database server 100 based on the database link 324a "db1").

Figure 5D:
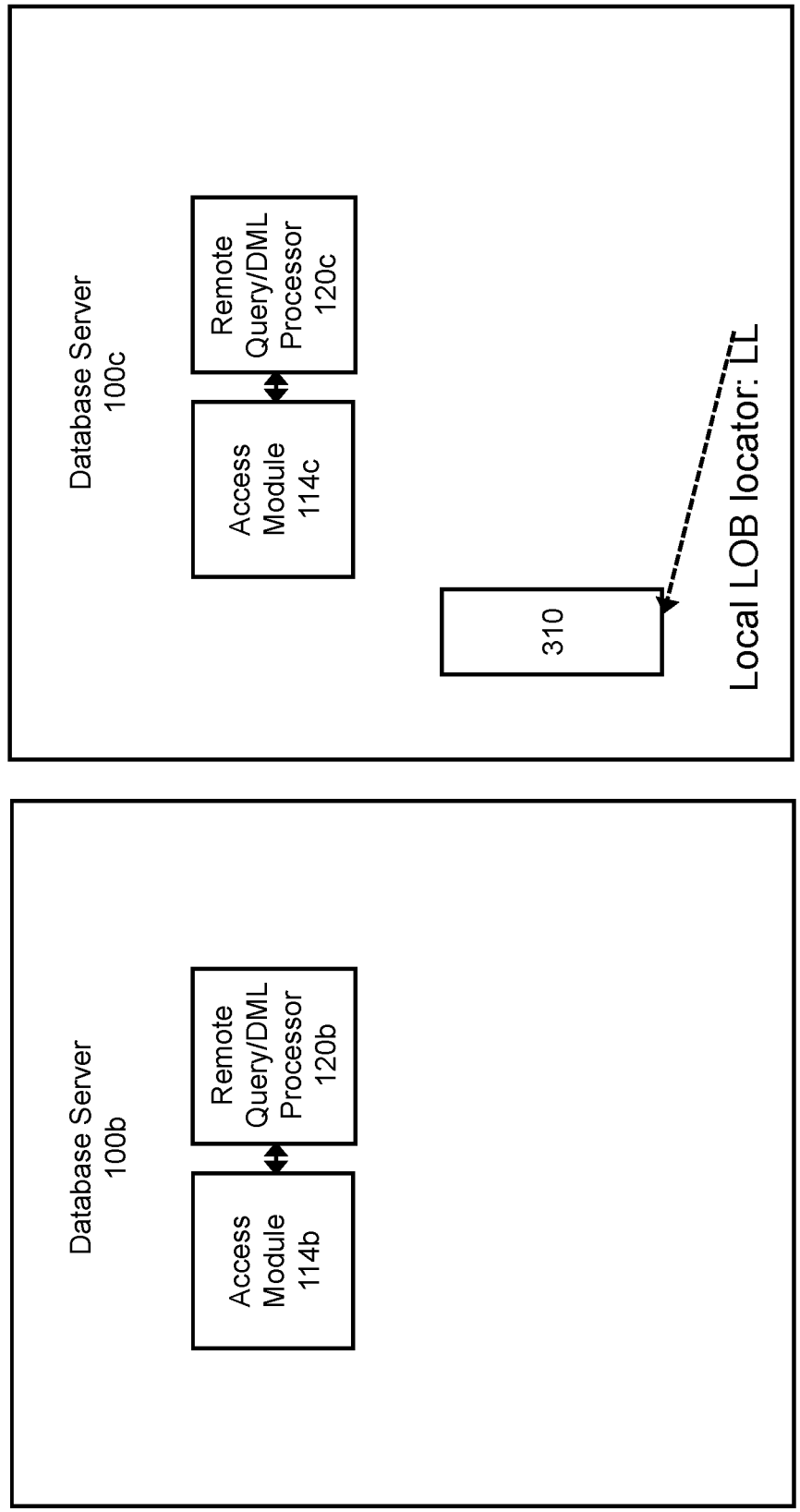

Assuming that the database link 324a "db1" refers to a connection between database server 100b and database server 100c, the remote query/DML processor 120b may forward 420 the request to database server 100c via API layer 110b after removing 410 the database link 324a "db1" and decrementing 415 the database link count 322 when the database link 324a is removed 410. As shown in FIGS. 5C and 5D in some embodiments, rather than decrementing 415 the database link count 322 from 1 to 0 when the only remaining database link 324a is removed 410, the remote query/DML processor 120b removes the database link information 320 from the remote LOB locator 300, leaving only the local LOB locator 310. Thus, as shown in FIG. 5D, database server 100c receives the local LOB locator 310, which is represented generically as "LL."

As described above, before forwarding 420 the request to database server 100c, the remote query/DML processor 120b at database server 100b may access a connection pool to determine whether a connection to database server 100c exists. If a connection exists, the request, which now includes the remote LOB locator 300 that is generically represented as "LL," is forwarded 420 to database server 100c over the connection; otherwise, if a connection does not exist, the remote query/DML processor 120b may open a new connection and forward 420 the request to database server 100c over the connection.

Once the request is received at database server 100c, the access module 114c may determine whether the request is directed to local data or to remote data. As described above, the access module 114c may do so by determining 405 whether database link information 320 has been appended to the local LOB locator 310 included in the request. Continuing with the above example, since the request does not include database link information 320, the access module 114c may determine that the operation is directed to data stored in a local database 118c. In some embodiments, the access module 114c may determine that the operation is directed to data stored in a local database 118c if no database link 324 is appended to the local LOB locator 310 or if the database link count 322 has a value of 0.

Figure 5E:
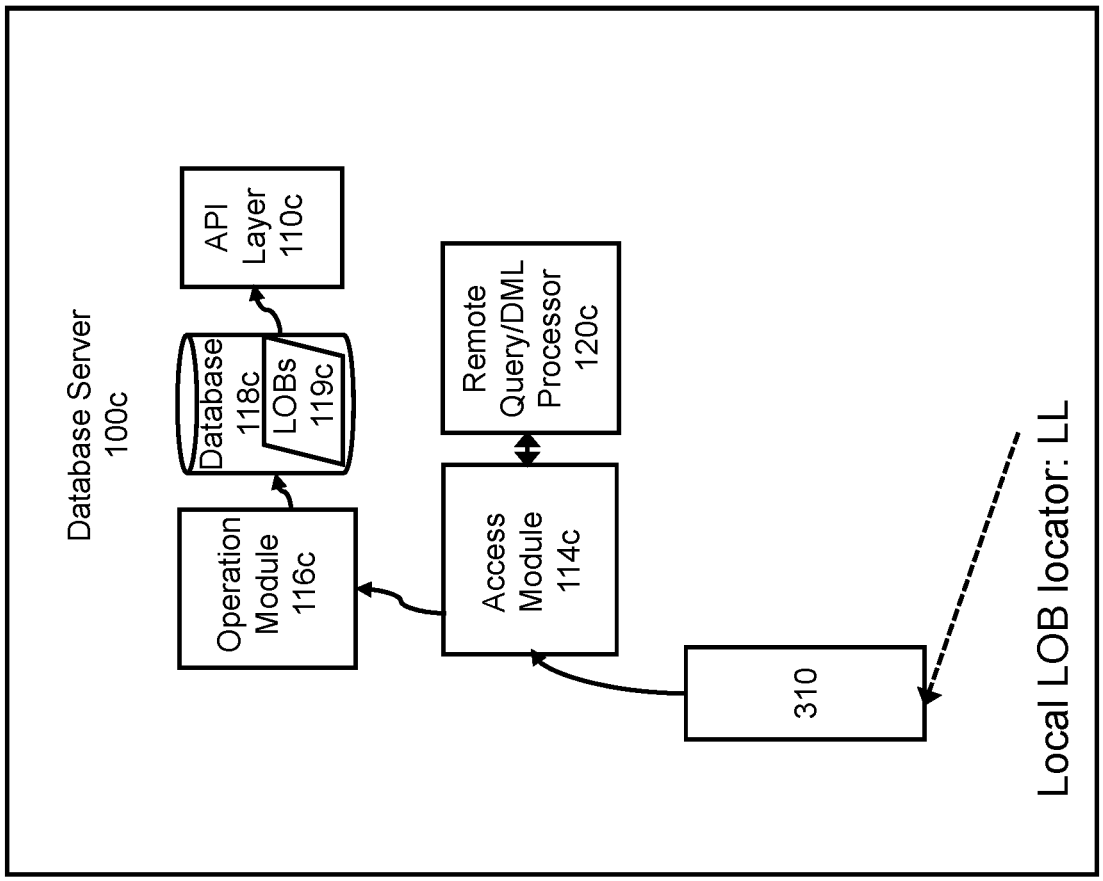

As shown in FIG. 5E, upon making the determination that the request to perform the operation is directed to data stored in local database 118c, the access module 114c may forward the request to perform the operation to the operation module 116c, which may then perform 225 the operation on the LOB 119c. Continuing with the above example, the local LOB locator 310 contained in the request may be generically represented as "LL" since the database link information 320 was previously removed at database servers 100a and 100b before forwarding 420 the request to database server 100c. Therefore, the operation module 116c may perform 225 the operation (e.g., a read or write operation) directed to the LOB 119c identified by the local LOB locator 310 corresponding to "LL." For example, if the operation is a read operation, the operation module 116c may perform 225 the operation by reading the data identified by the local LOB locator 310. This data is then forwarded to the API layer 110c which may then return the data back to the client 105.

As shown in FIG. 5F, if the operation is a read operation, the data that is read may be returned to the client 105 by hopping across the same set of database servers 100 used to forward the request from the client 105 to remote database server 100c, but in reverse (e.g., from database server 100c, to database server 100b, to database server 100a, to the client 105). In embodiments in which the operation is a write operation, the operation module 116c may perform 225 the operation by writing the data to be written to the location at the database 118c identified by the local LOB locator 310 and information confirming whether the write operation was successful may be returned to the client 105 by hopping across the same set of database servers 100 used to forward the request from the client 105 to the remote database server 100c, but in reverse.

In some embodiments, the request received 215 from the client 105 is a request to perform an operation directed to multiple remote LOBs 119. For example, the COMPARE operation may be directed to two different remote LOBs 119 to be compared with each other. In such embodiments, the remote LOBs 119 may be stored at the same remote database server 100 or at different remote database servers 100. In embodiments in which the remote LOBs 119 to which an operation is directed are stored at the same remote database server 100, the request is forwarded from the client 105 to the remote database server 100 at which the LOBs 119 are stored via the same set of intermediate database servers 100 (e.g., based on the same set of database links 324 included in their remote LOB locators 300). The operation module 116 at the remote database server 100 at which the LOBs 119 are stored then performs 225 the operation on the LOBs 119. The results of the operation are then forwarded back to the client 105 via the same set of intermediate database servers 100 to which the request was forwarded from the client 105 to the remote database server 100, but in reverse.

In embodiments in which the remote LOBs 119 to which an operation is directed are not stored at the same remote database server 100, the request is forwarded from the client 105 to a remote database server 100 via a common set of database servers 100. However, upon determining that the remote LOB locators 300 for the LOBs 119 include database links 324 for different remote database servers 100, the last common remote database server 100 on the paths to the LOBs 119 initiates new requests, performs 225 the operation on the LOBs 119, and returns the result of the operation back to the client 105.

Figure 6A:
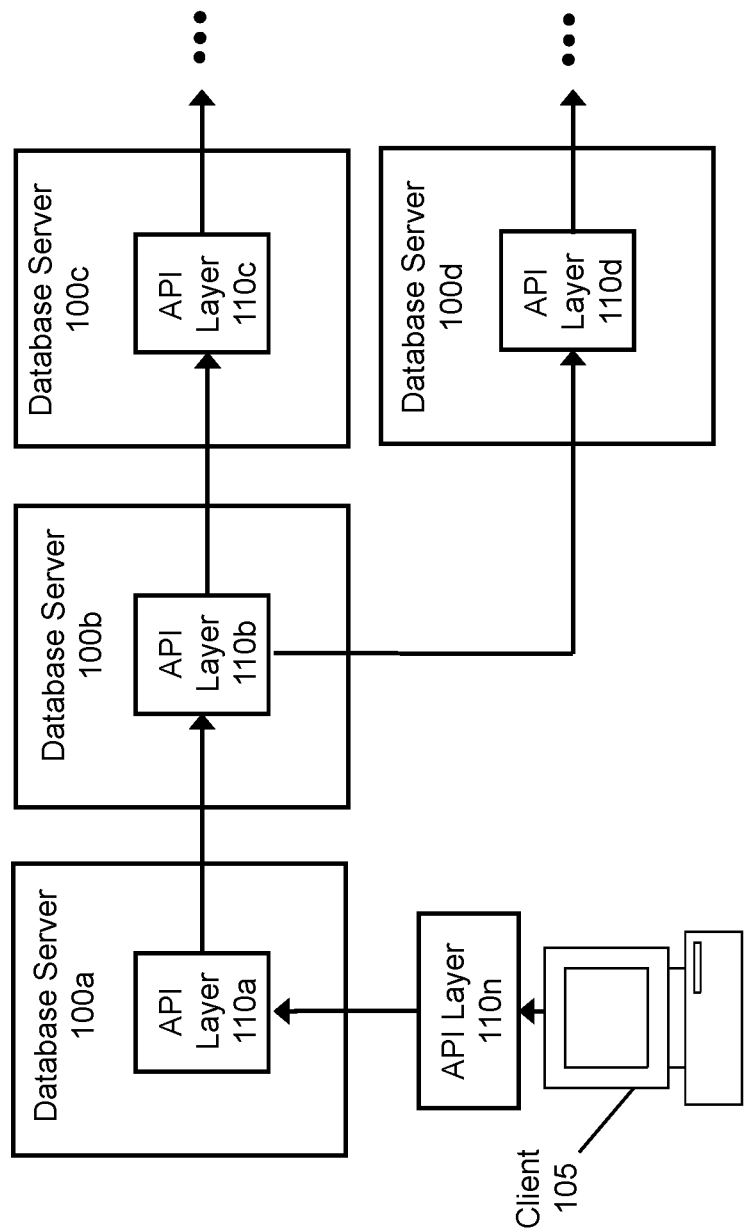
FIG. 6A illustrates an example of forwarding a request to perform an operation directed to multiple remote LOBs according to some embodiments of the invention.

For example, as shown in FIG. 6A, if the operation is a COMPARE operation, the request is forwarded from the client 105 to remote database server 100b via a common set of database servers 100 (database server 100a). As the request is forwarded along the common set of database servers 100, the access module 114 at each database server 100 determines whether the request is to be forwarded to the same remote database server 100 or to different remote database servers 100 based on the database link information 320 of the remote LOB locator 300 for each remote LOB 119 to be compared. When the request is forwarded to database server 100b, access module 114b will determine that one remote LOB locator includes a database link 324 for remote database server 100c, which is on a path to one of the remote LOBs 119 to be compared and another remote LOB locator includes a database link for remote database server 100d, which is on a different path to the other remote LOB 119 to be compared. As a result, remote database server 100b, the last common remote database server 100 on the path to the remote LOBs 119, initiates a new request to perform a READ operation on each of the LOBs 119 using the remote LOB locators 300 for each LOB 119. Database server 100b then forwards one request to perform the READ operation to database server 100c and forwards another request to perform the READ operation to database server 100d.

Figure 6B:
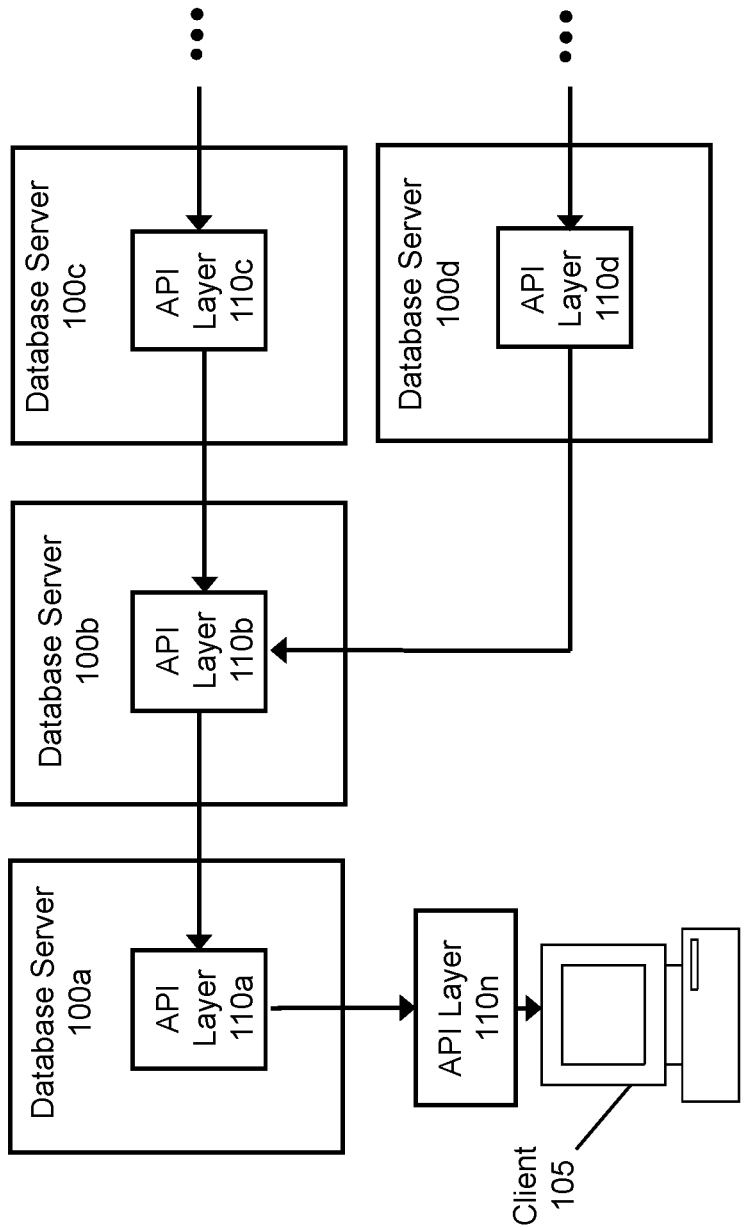
FIG. 6B illustrates an example of returning a result of a request to perform an operation directed to multiple remote LOBs to a client according to some embodiments of the invention.

Once each of the requests to perform the READ operation is forwarded to a remote database server 100 that stores a remote LOB 119 to be compared, the requests are processed 220, the READ operations are performed 225, and the results of the READ operations are returned to the last common remote database server 100b on the path to the remote LOBs 119, as shown in FIG. 6B and as described above in conjunction with FIGS. 4 and 5A-5F. Remote database server 100b obtains the contents of the LOBs 119 or their checksums and performs the COMPARE operation by comparing the contents or checksums (e.g., using the operation module 116b). The result of the COMPARE operation may then be returned to the client 105. The result for each request may be returned via the same set of database servers 100 to which the request was forwarded from the client 105 to the remote database servers 100, but in reverse order, as described above.

FIG. 7 is a flow chart for creating a remote LOB locator for a LOB stored in a remote database according to some embodiments of the invention. Some of the steps illustrated in the flowchart are optional in different embodiments. In some embodiments, the steps may be performed in an order different from that described in FIG. 7.

Suppose the access module 114a at the local database server 100a receives 205 the following query from the client 105: "SELECT Image FROM foo@db2;" where "Image" is a column containing LOB data in a table named "foo" and that the database link 324 "db2" refers to a connection between the local database server 100a and a remote database server 100. Upon determining that the query received 205 from the client 105 is directed to a LOB 119 stored in a remote database 118, the access module 114a may forward the query to the remote query/DML processor 120a. The remote query/DML processor 120a then forwards the query to the remote database 118 and a remote LOB locator 300 may be created 210 for the LOB 119.

To forward the query to the remote database 118, the remote query/DML processor 120a may identify 705 the connection required to connect to the next database server 100 on a path to the LOB 119. The remote query/DML processor 120a may identify 705 the connection by consulting a repository of information, such as a data dictionary stored at the database server 100a to retrieve information about how to connect to a database server 100 based on the database link 324 "db2." Assuming that the database link 324 "db2" points to information about how to connect to database server 100b, the remote query/DML processor 120a may then access a connection pool to determine whether a connection to database server 100b exists. If the remote query/DML processor 120a identifies an existing connection to the database server 100b in the connection pool, this connection is used to connect to remote database server 100b; otherwise, the remote query/DML processor 120a opens a new connection that is used to connect to the database server 100b. The query is then forwarded 715 to database server 100*b* over the connection via API layer 110*a*. In some embodiments, the remote query/DML processor 120*a* removes 710 the database link 324 before forwarding 715 the query, such that database server 100*b* receives the following query: "SELECT Image FROM foo;"

At database server 100*b*, once the access module 114*b* receives the query: "SELECT Image FROM foo;" the access module 114*b* may determine 720 whether the query is directed to remote data. The access module 114*b* may determine 720 whether the query is directed to remote data based on the presence of a database link 324 and/or by consulting a data dictionary stored at the database server 100*b*. For example, since the query does not include a database link 324, the access module 114*b* may consult a data dictionary stored at database server 100*b* to determine whether "foo" is a synonym. In the above example, suppose that the access module 114*b* determines that "foo" is a synonym defined as "bar@db1." The access module 114 therefore determines 720 that the query (now "SELECT Image FROM bar@db1") is directed to remote data and forwards the query to the remote query/DML processor 120*b*.

The remote query/DML processor 120*b* may then identify 705 the connection required to connect to the next database server 100 on a path to the LOB 119. The remote query/DML processor 120*b* may identify 705 the connection by consulting a data dictionary stored at the database server 100*b* to retrieve information about how to connect to a database server 100 based on the database link 324 "db1." Assuming that the database link 324 "db1" points to information about how to connect to database server 100*c*, the remote query/DML processor 120*b* may then forward 715 the query to database server 100*c* via API layer 110*b* after removing 710 the database link 324 "db1" from the query and accessing a connection pool to determine whether a connection to database server 100*c* exists, as described above.

Figure 8A:
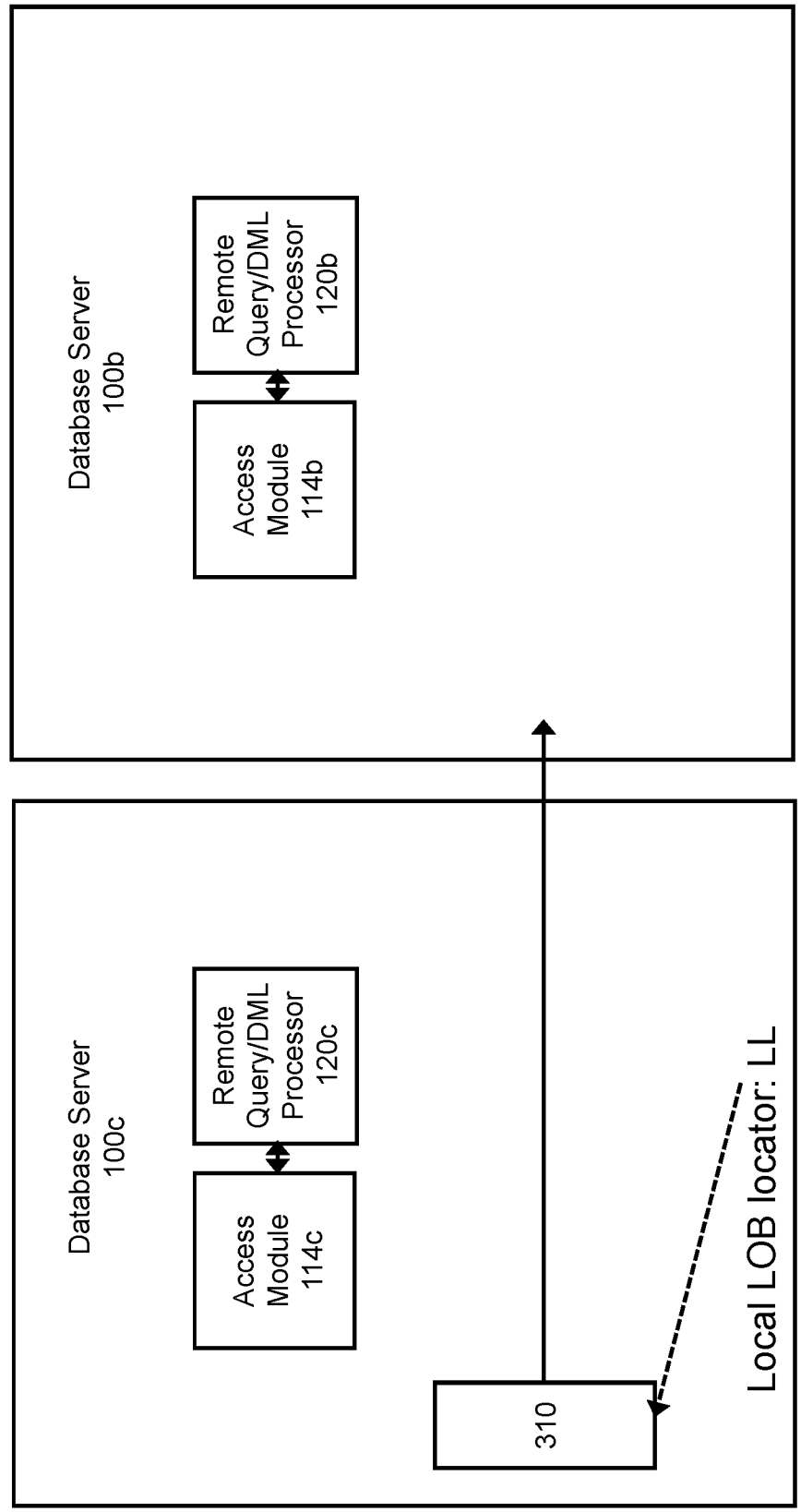
FIGS. 8A-8D illustrate an example of creating a remote LOB locator for a LOB stored in a remote database according to some embodiments of the invention.

The access module 114*c* at database server 100*c* may determine 720 whether the query is directed to remote data based on the presence of a database link 324 included in the query and/or by consulting a data dictionary stored at the database server 100*c*. Continuing with the above example, since the access module 114*c* receives the following query: "SELECT Image FROM bar," which does not include a database link 324, the access module 114*c* may consult a data dictionary stored at database server 100*c* to determine whether "bar" is a synonym. In the above example, suppose that the access module 114*c* determines that "bar" is not a synonym. Therefore, the access module 114*c* determines 720 that the query is not directed to remote data and may forward the query to the operation module 116*c*. The operation module 116*c* may then obtain the information requested by the query (i.e., "Image") and generate/obtain 725 the local LOB locator 310 for the LOB column (generically represented as "LL"). Once the operation module 116*c* has generated/obtained 725 the local LOB locator 310, the local LOB locator 310 is forwarded 730 to database server 100*b*, which is the previous database server 100 on the path to the LOB 119, as shown in FIG. 8A, at which the database link information 320 is appended 735.

Figure 8B:
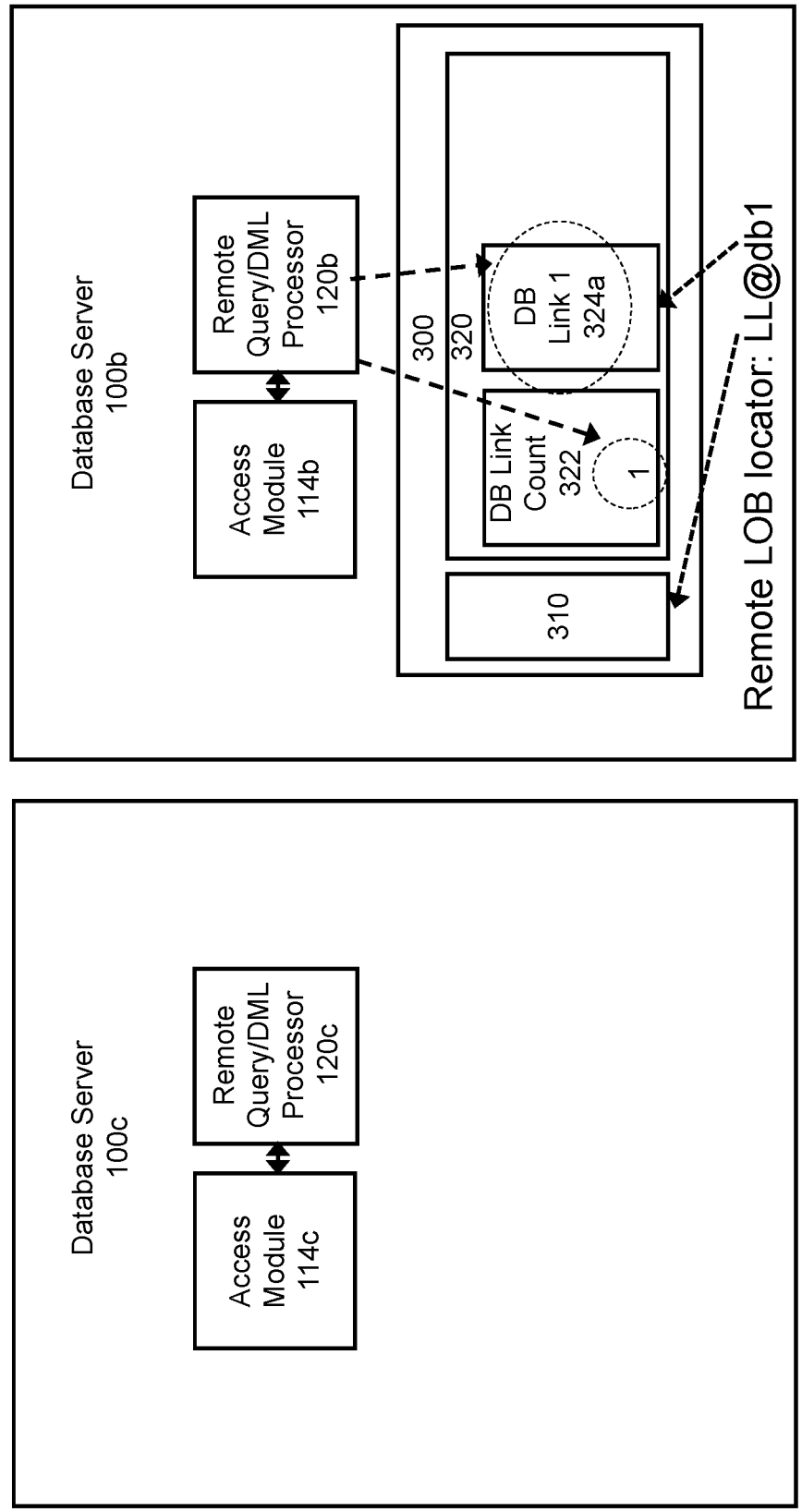

The remote query/DML processor 120*b* at database server 100*b* may append 735 database link count 322 to the local LOB locator 310 and initialize 735 the value of this count to 0. Furthermore, the remote query/DML processor 120*b* may also append 735 the first database link 324*a* (generically represented as "db1") to the local LOB locator 310. The first database link 324*a* refers to a connection between database server 100*b* and database server 100*c*. Upon appending 735 this first database link 324*a*, the remote query/DML processor 120*b* may also increment 735 the value of database link count 322 to 1. As shown in the example of FIG. 8B, in alternative embodiments, rather than initializing 735 the value of database link count 322 to 0 and then incrementing 735 the value to 1, when the remote query/DML processor 120*b* appends 735 the database link count 322 to the local LOB locator 310, it may initialize 735 the value of this count to 1.

Continuing with the above example, the remote query/DML processor 120*b* at database server 100*b* may determine 740 if a previous database server 100 exists on the path to the LOB 119. In some embodiments, the remote query/DML processor 120*b* may determine 740 if a previous database server 100 exists on the path to the LOB 119 based on an existing connection between database server 100*b* and a previous database server 100 from which the query was forwarded 715. For example, if the query directed to the LOB 119 was forwarded 715 from database server 100*a* to database server 100*b* over a connection between the database servers 100*a-b*, this connection remains open when the remote query/DML processor 120*b* at database server 100*b* determines 740 if a previous database server 100 exists on the path to the LOB 119. In various embodiments, the remote query/DML processor 120*b* may determine 740 if a previous database server 100 exists on the path to the LOB 119 by consulting a repository of information, such as a data dictionary, to retrieve information about an existing connection between database server 100*b* and a previous database server 100 over which the query was forwarded 715.

Figure 8C:
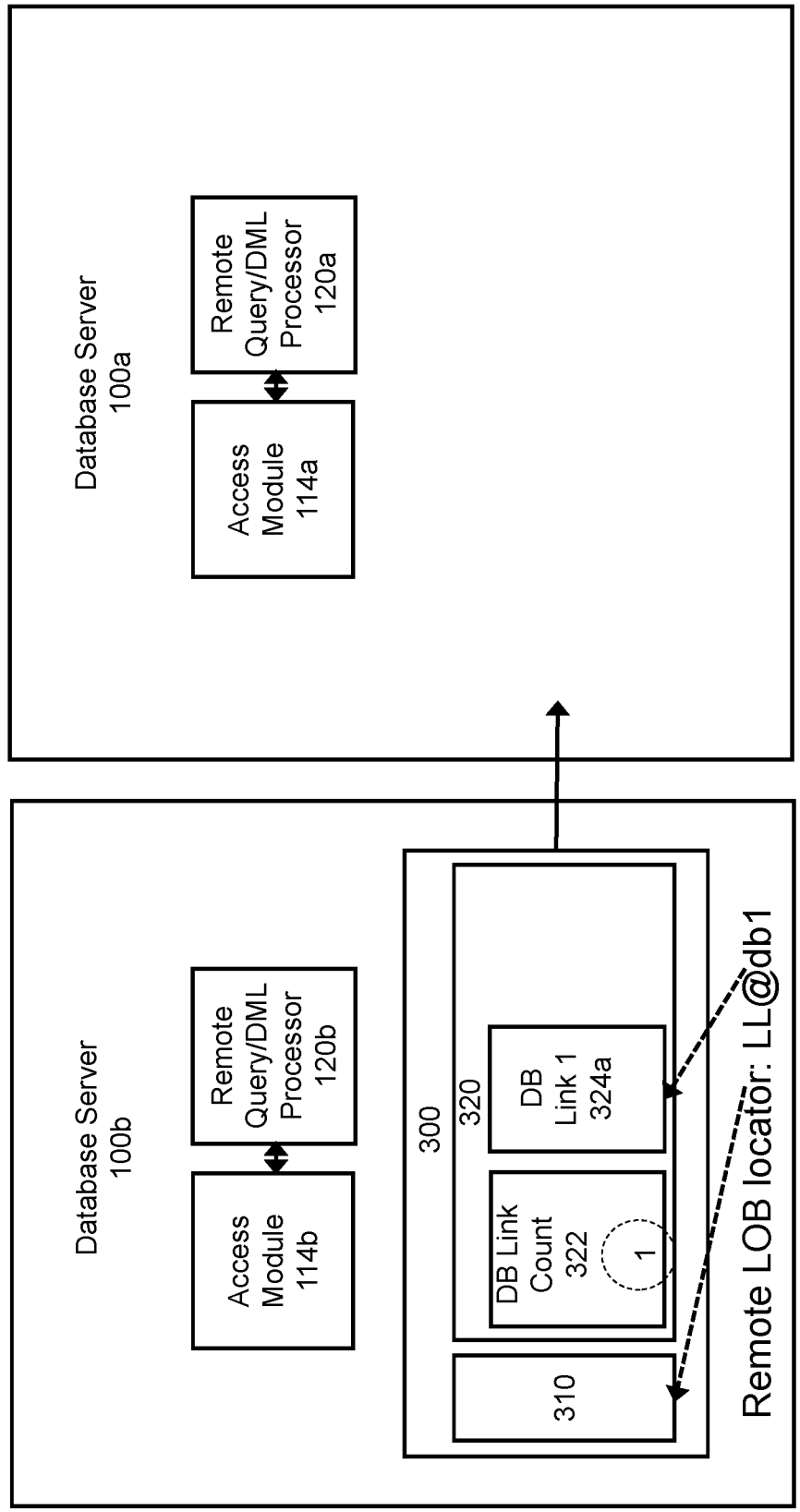
Figure 8D:
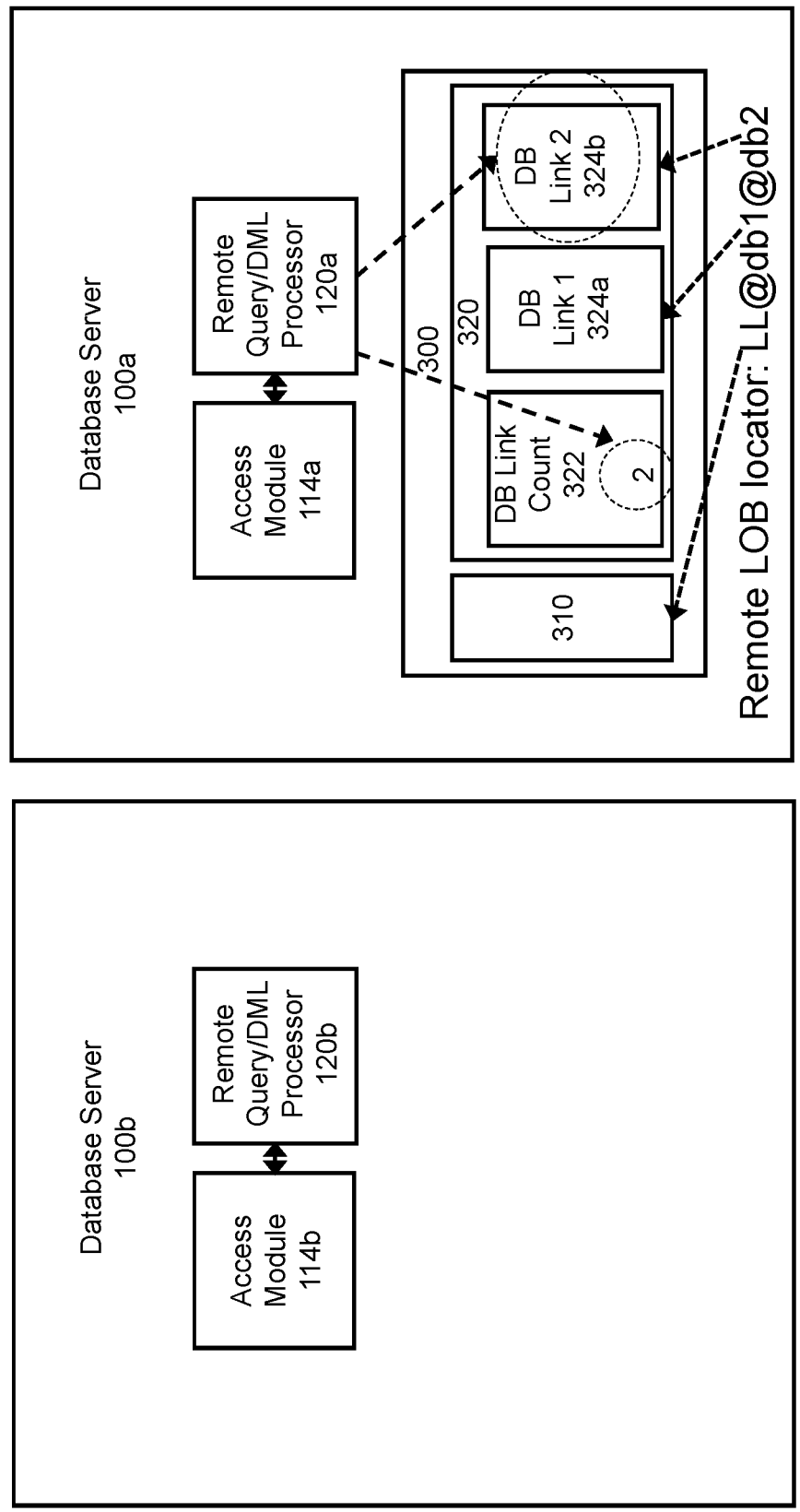
Figure 8E:
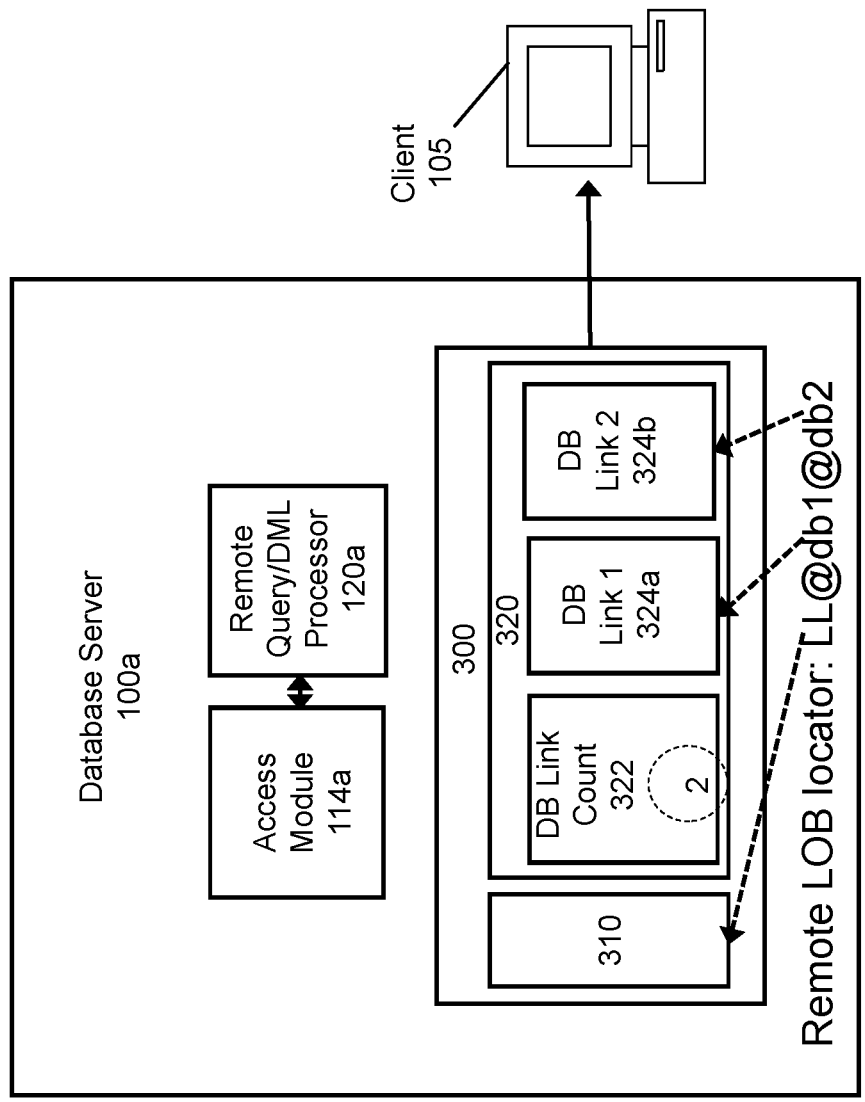
FIG. 8E illustrates an example of receiving a remote LOB locator for a LOB stored in a remote database at a client according to some embodiments of the invention.

Since a previous database server 100 exists on the path to the LOB (i.e., database server 100*a*) the remote LOB locator 300, which now includes the local LOB locator 310 and the database link information 320 (database link count 322 and database link 324*a*), is forwarded 730 from the remote query/DML processor 120*b* at database server 100*b* to the remote query/DML processor 120*a* at database server 100*a* (e.g., via API layer 110*b*), as shown in FIG. 8C. As shown in FIG. 8D, the remote query/DML processor 120*a* may append 735 the second database link 324*b* (generically represented as "db2") to the local LOB locator 310 of the remote LOB locator 300, in which the database link 324*b* refers to a connection between database server 100*a* and database server 100*b*. Furthermore, the remote query/DML processor 120*a* may increment 735 the value of the database link count 322 to 2. The remote query/DML processor 120*a* at database server 100*a* may then determine 740 if a previous database server 100 exists on the path to the LOB 119. Since a previous database server 100 does not exist on the path to the LOB, as shown in FIG. 8E, the remote LOB locator 300, which now includes the local LOB locator 310 and the database link information 320 (database link count 322 and database links 324*a-b*), is forwarded 745 from database server 100*a* to the client 105 (e.g., via API layer 110*n*).

Once the client 105 has received the remote LOB locator 300 for the LOB 119 stored in the remote database 118, the client 105 may submit a request to perform an operation directed to the LOB 119 stored in the remote database 118. As shown in FIG. 8F, for example, the local database server 100*a* may receive 215 a request (e.g., a remote procedure call) from the client 105 to perform an operation that is directed to the LOB 119*c*, in which the request contains the remote LOB locator 300 for the LOB 119*c* that was previously created 210. Based on the database links 324 included in the database link information 320 of the remote LOB locator 300, the request may be forwarded to database server 100c at which the LOB 119c is located and processed, as described above in conjunction with FIGS. 4 and 5A-5F.

In some embodiments, rather than traversing through database server 100b, as illustrated in FIGS. 5A-5F, the remote query/DML processor 120a at the local database server 100a may identify 705 the connection required to connect directly to the database server 100 at which the LOB 119 is stored. For example, the remote query/DML processor 120a at the local database server 100a may consult a data dictionary stored at the database server 100a to identify the remote database server 100 at which the LOB 119 is stored and then retrieve information about how to connect directly to the database server 100. The remote query/DML processor 120a may then forward 715 the query to the database server 100 over the connection via API layer 110a. In such embodiments, the information requested by the query and the remote LOB locator 300 may be forwarded directly back to database server 100a. For example, the remote query/DML processor 120c at the local database server 100c may forward the query results and the remote LOB locator 300 directly back to database server 100a using the same connection used to forward 715 the query directly to database server 100c.

In some embodiments, when the results of the query and the remote LOB locator 300 are returned to the client 105, an additional portion of the LOB 119 is "prefetched," or returned to the client 105 as well. For example, when a query that is directed to a remote LOB 119 is forwarded to the database server 100 at which the LOB 119 is stored, the results of the query and an additional portion of the LOB 119 (e.g., 8 KB) are retrieved and returned to the client 105 together with the remote LOB locator 300 (e.g., along the same path of database servers 100 used to forward the query to the database server 100, but in reverse). In embodiments in which prefetching is enabled, the size and portion of the LOB 119 that may be prefetched may be configured. For example, prefetching may be configured to retrieve the first portion of a LOB 119 that will fit into a buffer of a predetermined size (e.g., a predetermined number of bytes for BLOBs or a predetermined number of characters for CLOBs). Prefetching may increase the efficiency with which LOB data is retrieved by the client 105. For example, if a remote LOB locator 300 is returned to the client 105 with a prefetched portion of the LOB 119, in situations in which subsequent requests received from the client 105 require the retrieval of the information that has been prefetched, an additional roundtrip that would otherwise be required to forward the request from the client 105 to the database server 100 at which the LOB 119 is stored and to return the response to the request to the client 105 can be avoided.

In various embodiments, although the database servers 100 and the client 105 may support different character sets (e.g., ASCII, ANSI, and UTF-8) when data (e.g., the result of a query or a request to perform an operation) is returned to the client 105, it is forwarded to the client 105 in the original character set used to store the data. Therefore, the data may be returned to the client 105 absent interpretation of the data by the database servers 100. For example, suppose data is stored in remote database 118b at database server 100b using the UTF-8 character set and is forwarded back to the client 105 via the local database server 100a, in which the local database server 100a uses the UTF-16 character set and the client uses the ASCII character set. In this example, the data will be forwarded from database server 100b to the client 105 in the UTF-8 character set without performing a character set conversion to UTF-16 at the local database server 100a and another character set conversion to ASCII at the client 105—only one character set conversion occurs at the client 105 from UTF-8 to ASCII. In some embodiments, information describing the original character set used to store the data is returned to the client 105 (e.g., in a field 312 in the local LOB locator 310). Thus, if the database servers 100 along the path to the remote database server 100 at which the LOB 119 is stored use different character sets, the process of propagating the data from the remote database server 100 to the client 105 is optimized by avoiding unnecessary character set conversions; only a single character set conversion is performed to convert the data to the character set used by the client 105.

Avoiding the performance of character set conversions may be advantageous in various embodiments. For example, by avoiding the performance of character set conversions at the database servers 100, time and CPU resources may be saved. Furthermore, avoiding the performance of character set conversions at the database servers 100 also may prevent the loss of data. For example, if the data is converted to a character set used by a database server 100 when it is being returned to the client 105, in which the character set used by the database server 100 is neither as rich as the character set used to store the data nor as rich as the character set used by the client 105, some data loss may occur when the data is converted to the character set used by the client 105.

In some embodiments, the query received 205 from the client 105 may be directed to a remote LOB 119 stored in a sharded database 118 (i.e., a database 118 containing a sharded table, in which a set of rows of the sharded table is horizontally partitioned across multiple databases 118). As shown in FIG. 9A, in such embodiments, a database server 100 (e.g., the local database server 100a) may coordinate the query by redirecting the query to each partition or "shard" to which the query is directed (e.g., at database server 100b, database server 100c, and database server 100d) and subsequently receive the result of the query from each shard, as well as the remote LOB locator 300 for the LOB 119, as described above in conjunction with FIGS. 7 and 8A-8F. The database server 100 may then combine the results of the query and return them and the remote LOB locators 300 to the client 105, as shown in FIG. 9B. Similarly, if a request to perform an operation directed to a LOB 119 stored in a sharded database 118 is received 215 from the client 105, a database server 100, such as the local database server 100a, may coordinate the request by redirecting the request to each shard to which the request is directed, in which the request contains the remote LOB locator 300 for the LOB 119 to which the request is directed. Each of the requests are then processed 220, the operations are performed 225, and the results of the operations are returned to the local database server 100a, as described above in conjunction with FIGS. 4 and 5A-5F. The local database server 100a may then combine the results of the operation and return them to the client 105.

Figure 10:
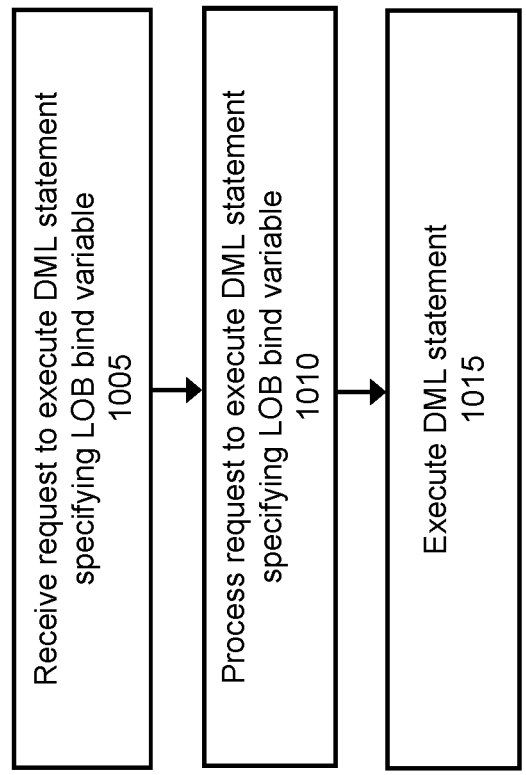
FIG. 10 is a flow chart for executing a DML statement specifying a LOB bind variable according to some embodiments of the invention.

FIG. 10 is a flow chart for executing a DML statement specifying a LOB bind variable according to some embodiments of the invention. In some embodiments, the steps may be performed in an order different from that described in FIG. 10. Some of the steps illustrated in the flowchart are optional in different embodiments.

The flow chart begins when the local database server 100a receives 1005 a request from the client 105 to execute a data manipulation language (DML) statement specifying a LOB bind variable. Examples of DML statements include INSERT, UPDATE, DELETE, and SELECT statements. For example, the client 105 may issue a request to perform the following DML statement: "INSERT INTO foo@remote VALUES (:a);" in which "foo" is a remote table and ":a" is a LOB bind variable that corresponds to a local LOB locator 310 or to a remote LOB locator 300. As an additional example, the client 105 may issue the following DML statement: "INSERT INTO foo VALUES (:a);" in which "foo" is a local table but ":a" is LOB bind variable that corresponds to a remote LOB locator 300. Upon receiving 1005 the request to execute the DML statement specifying the LOB bind variable, the request may be processed 1010 and the DML statement executed 1015.

Figure 11A:
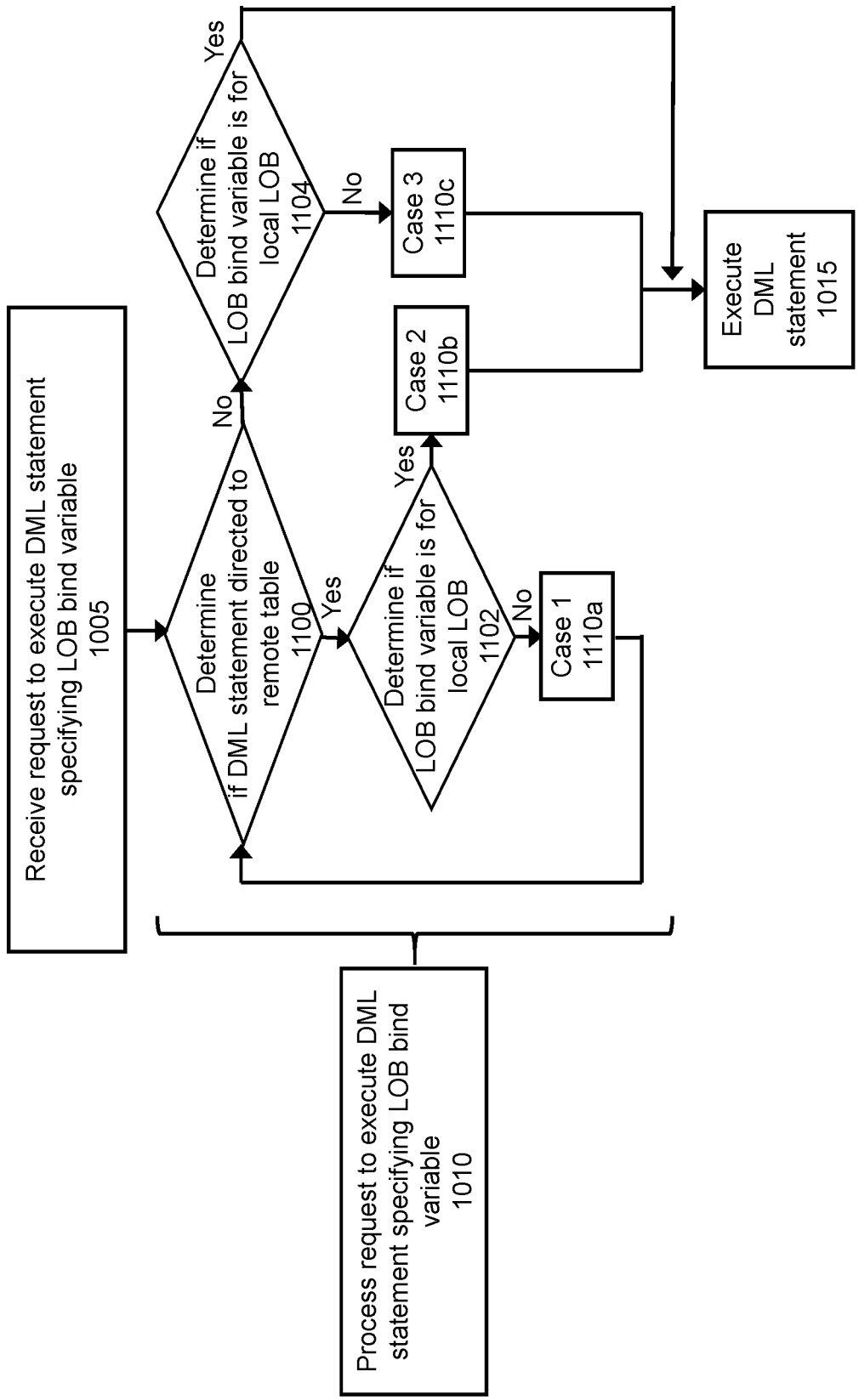
FIG. 11A is a flow chart for processing a request to execute a DML statement specifying a LOB bind variable according to some embodiments of the invention.

FIG. 11A is a flow chart for processing a request to execute a DML statement specifying a LOB bind variable according to some embodiments of the invention. In some embodiments, the steps may be performed in an order different from that described in FIG. 11A. Some of the steps illustrated in the flowchart are optional in different embodiments.

As shown in FIG. 11A, to process 1010 a request to execute a DML statement specifying a LOB bind variable, the access module 114a at the local database server 100a may first determine 1100 whether the DML statement is directed to a remote table. If the access module 114a determines 1100 that the DML statement is directed to a remote table, the access module 114a may then determine 1102 if the LOB bind variable is for a local LOB (i.e., corresponds to a local LOB locator 310). If the access module 114a determines 1102 that the LOB bind variable is not for a local LOB 119, but for a remote LOB 119 (i.e., corresponds to a remote LOB locator 300), case 1 1110a (i.e., remote DML with a remote LOB locator as a bind value) arises. However, after determining 1100 that the DML statement is directed to a remote table, if the access module 114a determines 1102 that the LOB bind variable is for a local LOB 119, case 2 1110b (i.e., remote DML with a local LOB locator as a bind value) arises. Alternatively, if the access module 114a determines 1100 that the DML statement is not directed to a remote table, but to a local table, and determines 1104 that the LOB bind variable is not for a local LOB 119, but for a remote LOB 119, case 3 (i.e., local DML with a remote LOB locator as a bind value) 1110c arises. Finally, if the access module 114a determines 1100 that the DML statement is not directed to a remote table, but to a local table and determines 1104 that the LOB bind variable is for a local LOB 119, the DML statement is forwarded to the operation module 116a at the local database server 100a, which executes 1015 the DML statement. For each case 1110, the DML statement eventually may be executed 1015 after proceeding through the steps of the case 1110.

Figure 11B:
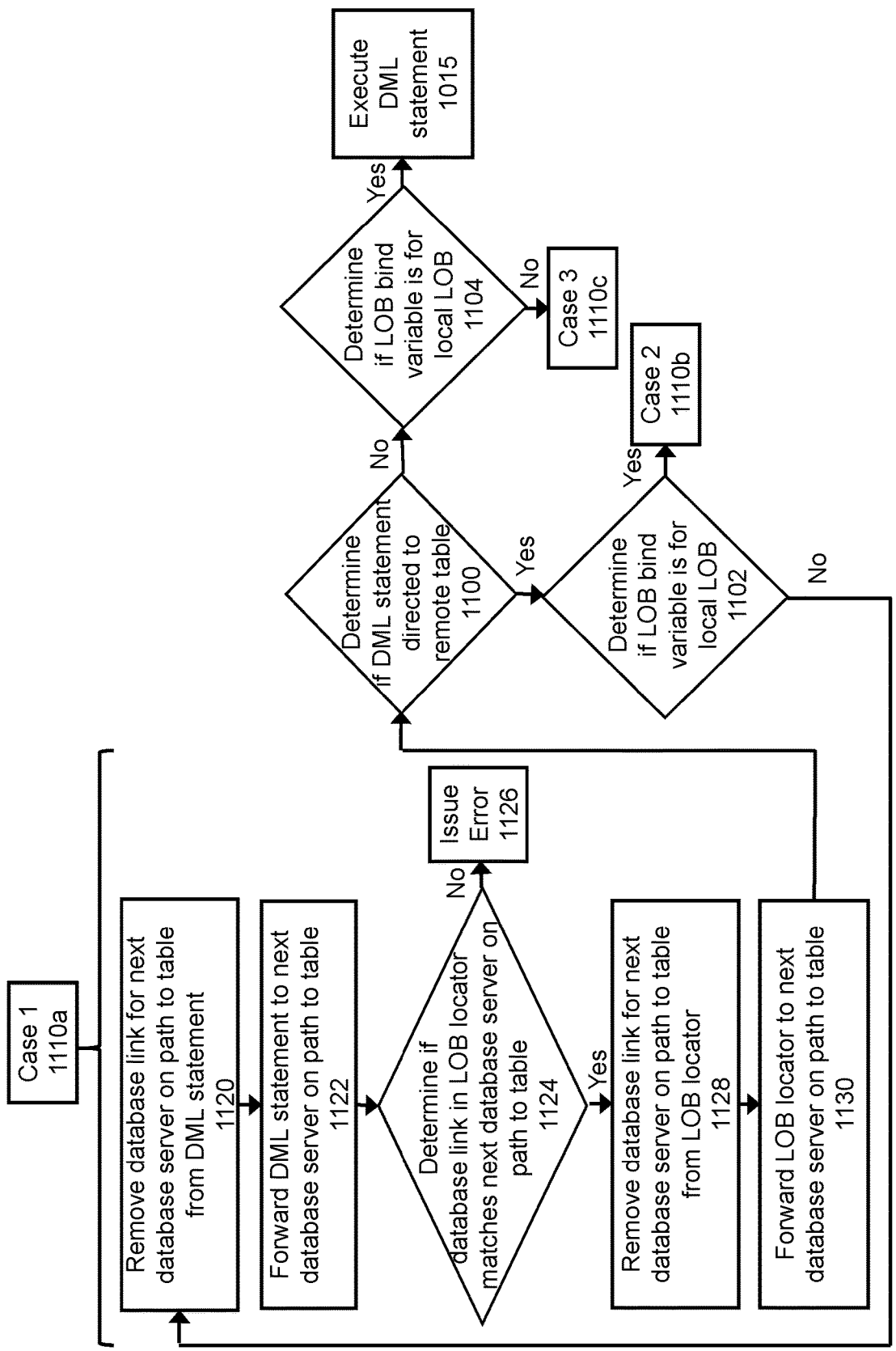
FIG. 11B is a flow chart for processing a request to execute a DML statement directed to a remote table and specifying a LOB bind variable corresponding to a remote LOB locator according to some embodiments of the invention.

FIG. 11B, is a flow chart for processing a request to execute a DML statement directed to a remote table and specifying a LOB bind variable corresponding to a remote LOB locator according to some embodiments of the invention. In some embodiments, the steps may be performed in an order different from that described in FIG. 11B. Some of the steps illustrated in the flowchart are optional in different embodiments.

Suppose that the client 105 issues a request to execute the following DML statement: "INSERT INTO foo@remote VALUES (:a);" in which "foo" is a remote table and ":a" is a LOB bind variable that corresponds to a remote LOB locator 300 that may be generically represented as "LL@db1@db2 . . . @dbN," giving rise to case 1. As illustrated in FIG. 11B, upon determining that case 1 1110a has arisen, the access module 114a at the local database server 100a may forward the request to the remote query/DML processor 120a, which may remove 1120 the database link 324 "remote" from the DML statement and forward 1122 the DML statement to the next database server 100 on the path to the table "foo" based on the connection between the local database server 100a and the remote database server 100 to which the database link 324 "remote" refers.

The remote query/DML processor 120a at the local database server 100a may then determine 1124 if a database link 324 in the remote LOB locator 300 corresponding to the LOB bind variable (e.g., the last database link 324, which is generically represented as "dbN") matches the name of the database link 324 ("remote") used to forward 1122 the DML statement. If it does not, an error may be issued 1126 that indicates that the remote LOB locator 300 is being forwarded on a path that does not eventually lead to a database server 100 at which the LOB 119 is stored. Alternatively, if the remote query/DML processor 120a determines 1124 that the database link 324 matches the name of the database link 324 used to forward 1122 the DML statement to the remote database server 100, the database link 324 is removed 1128 from the remote LOB locator 300 and the remote LOB locator 300 is forwarded 1130 to the database server 100 to which the DML statement was forwarded 1122. The process (steps 1120 through 1130) may be repeated at any subsequent database servers 100 until an error is issued 1126, until one of the other cases 1110 arises, or until the DML statement may be executed 1015.

Figure 11C:
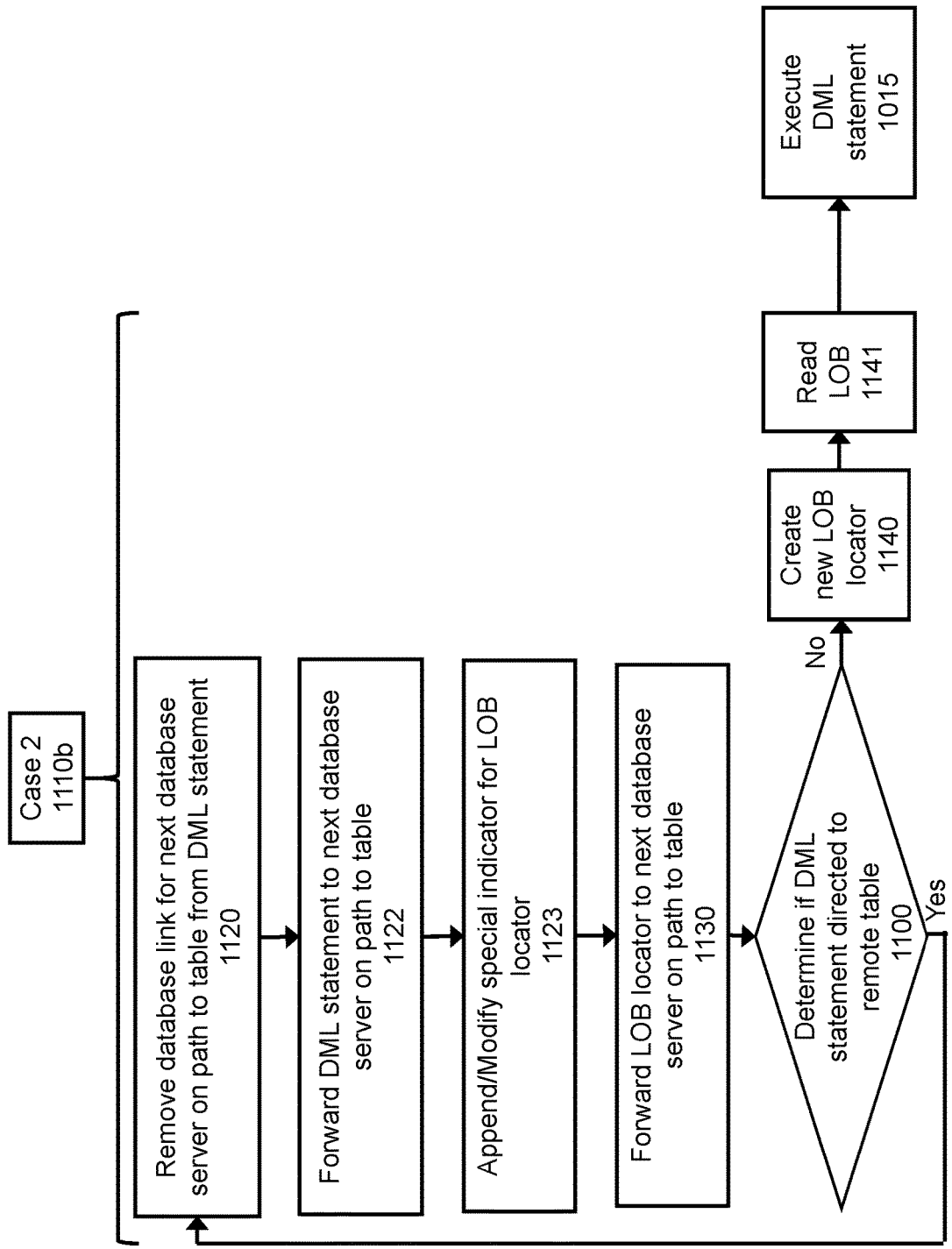
FIG. 11C is a flow chart for processing a request to execute a DML statement directed to a remote table and specifying a LOB bind variable corresponding to a local LOB locator according to some embodiments of the invention.

FIG. 11C is a flow chart for processing a request to execute a DML statement directed to a remote table and specifying a LOB bind variable corresponding to a local LOB locator according to some embodiments of the invention. In some embodiments, the steps may be performed in an order different from that described in FIG. 11C. Some of the steps illustrated in the flowchart are optional in different embodiments.

Alternatively, suppose that the client 105 issues a request to execute the following DML statement: "INSERT INTO foo@remote VALUES (:a);" in which "foo" is a remote table and ":a" is a LOB bind variable that corresponds to a local LOB locator 310 (i.e., a locator for a local LOB 119a stored in database 118a) that may be generically represented as "LL," giving rise to case 2 1110b. As illustrated in FIG. 11C, upon determining that case 2 1110b has arisen, the access module 114a may forward the request to the remote query/DML processor 120a, which may remove 1120 the database link 324 "remote" from the DML statement and forward 1122 the DML statement to a remote database server 100 based on the connection between the local database server 100a and the remote database server 100 to which the database link 324 "remote" refers.

The access module 114a may then append 1123 a special indicator to the local LOB locator 310 corresponding to the LOB bind variable before forwarding 1130 the local LOB locator 310 to the remote database server 100 to which the DML statement was forwarded 1122. The special indicator appended 1123 to the local LOB locator 310 indicates that the database server 100a at which the LOB 119a is located is upstream of the database server 100 to which the DML statement and the local LOB locator 310 are being forwarded 1122, 1130. For example, after appending 1123 the special indicator "@!(1)" to the local LOB locator 310, the LOB bind variable may correspond to the generic representation "LL@!(1)," where "!(1)" indicates that the LOB 119a is stored one database server 100 upstream of the database server 100 to which the local LOB locator 310 is being forwarded 1130. The local LOB locator 310 (along with the appended 1123 special indicator) is then forwarded 1130 to the remote database server 100 to which the DML statement was forwarded 1122.

Assuming that the DML statement and the local LOB locator 310 were forwarded 1122, 1130 to remote database server 100*b*, the access module 114*b* at database server 100*b* receives the following DML statement from the local database server 100*a*: "INSERT INTO foo VALUES (:a);" Since the DML statement does not include any database links 324, the access module 114*b* at the remote database server 100*b* may determine 1100 that the DML statement is not directed to a remote table. The access module 114*b* may then forward the DML statement to the operation module 116*b*. The operation module 116*b* may create 1140 a new LOB locator (generically represented as "NL") that is local to the database 118*b* at the remote database server 100*b* and insert the new LOB locator into database 118*b*.

The DML statement may then be executed 1015 by populating the new LOB locator "NL." To populate the new LOB locator, the remote query/DML processor 120*b* at the remote database server 100*b* may issue a request to perform 1141 a READ operation on the LOB 119*a* based on the local LOB locator 310 and the special indicator appended 1123 to it ("LL@!(1)"). The remote query/DML processor 120*b* may then remove the special indicator "@!(1)" from the local LOB locator 310 and forward the READ operation to the upstream database server 100*a* (e.g., via API layer 110*a*). The operation module 116*a* at database server 100*a* may then perform 1141 the READ operation on the LOB 119*a* at database 118*a* and return the requested data to the access module 114*b* at database server 100*b* (e.g., via API layer 110*a*). The access module 114*b* may then forward the requested data to the operation module 116*b*, which executes 1015 the DML statement by populating the new LOB locator "NL" with the data.

In various embodiments in which case 2 1110*b* arises, the DML statement issued by the client 105 may contain a synonym for another table. For example, in the DML statement: "INSERT INTO foo@remote VALUES (:a);" "foo" may be a synonym for a different remote table in a different remote database 118 (e.g., for "bar@db2" at database server 100*c*). In such embodiments, in addition to removing 1120 the database links 324 (e.g., "remote" and "db2") from the DML statement and forwarding 1122 the DML statement twice based on the connection to which the database links 324 refer, the local LOB locator 310 may also be forwarded 1130 twice, after the special indicator appended 1123 to the local LOB locator 310 is modified 1123. The special indicator appended 1123 to the local LOB locator 310 may be modified 1123 to indicate that the database server 100 at which the LOB 119 is located is two database servers 100 upstream of the database server 100 to which the DML statement and the local LOB locator 310 are being forwarded 1122, 1130. For example, as shown in FIG. 11D, the LOB bind variable may correspond to the generic representation "LL@!(2)" after appending 1123 the special indicator "@!(1)" to the local LOB locator 310 "LL" and modifying 1123 the special indicator to "@!(2)" where "!(2)" indicates that the LOB 119*a* is stored two database servers 100 upstream of the database server 100*c* to which the local LOB locator 310 is forwarded 1130. This may be repeated any number of times, such that the special indicator may be generically represented as "@!(N)" in which N indicates a LOB 119 is stored at a database server 100 that is N number of database servers 100 upstream of the current database server 100.

Figure 11E:
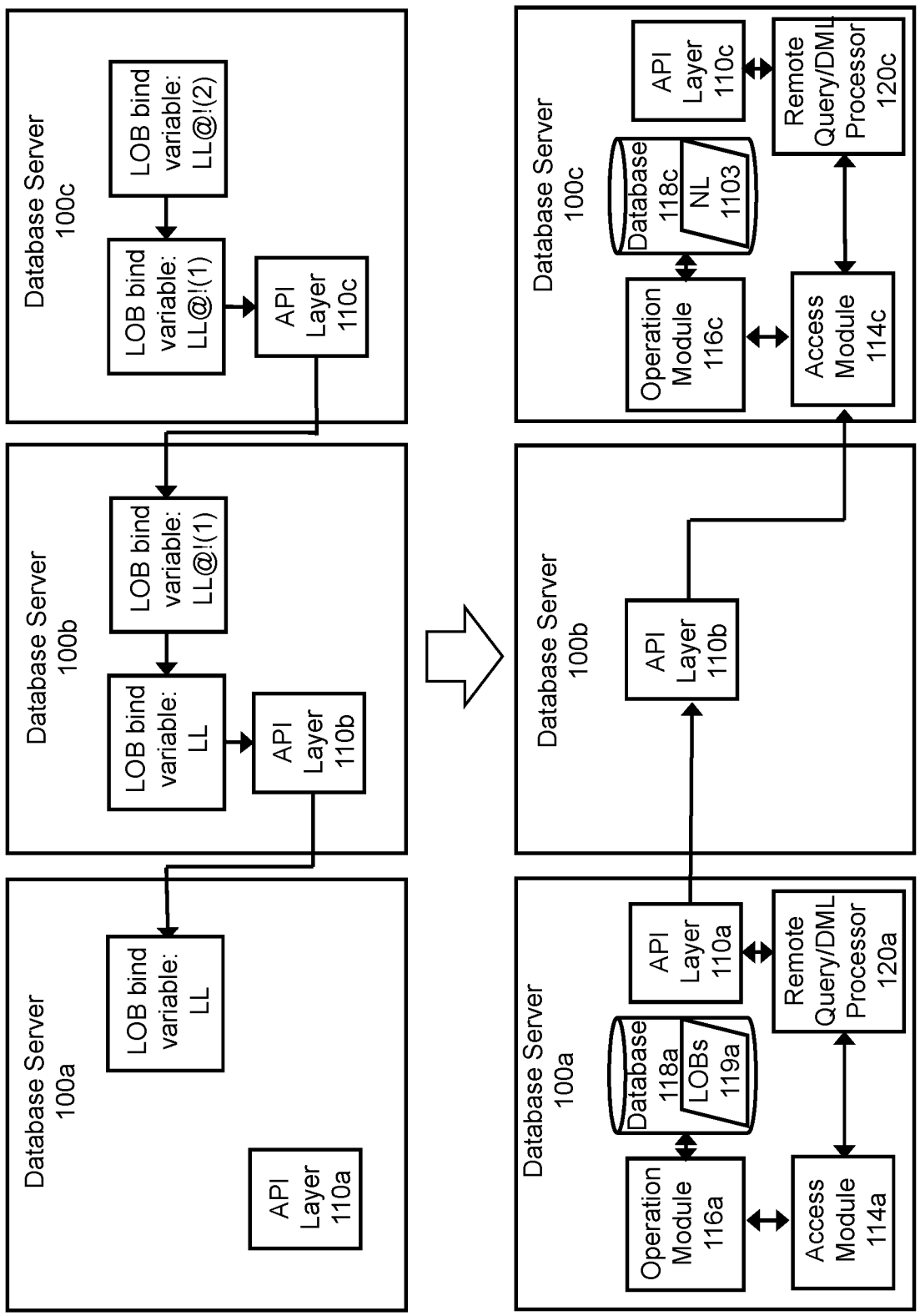
FIG. 11E illustrates an example of returning a result of a request to execute a DML statement directed to a remote table and specifying a LOB bind variable corresponding to a local LOB locator according to some embodiments of the invention.

As illustrated in FIG. 11E, to execute 1015 the DML statement, when the database server 100*c* at which the remote table is located performs the INSERT operation, it may issue a request to perform a READ operation to an upstream database server 100 based on the special indicator appended 1123 to the local LOB locator 310 and modify the special indicator so that it is generically represented as "LL@!(N−1)" prior to forwarding the request to the next upstream database server 100. The entire process may be repeated until the request to perform the READ operation is received by the local database server 100*a* at which the LOB 119*a* is located. The operation module 116*a* at the local database server 100*a* may then perform the READ operation on the LOB 119*a* and return the requested data to remote database server 100*c* at which the INSERT operation is being performed. The access module 114*c* at the remote database server 100*c* may then forward the requested data to the operation module 116*c*, which populates the new LOB locator 1103 "NL" with the requested data, as described above.

Figure 11F:
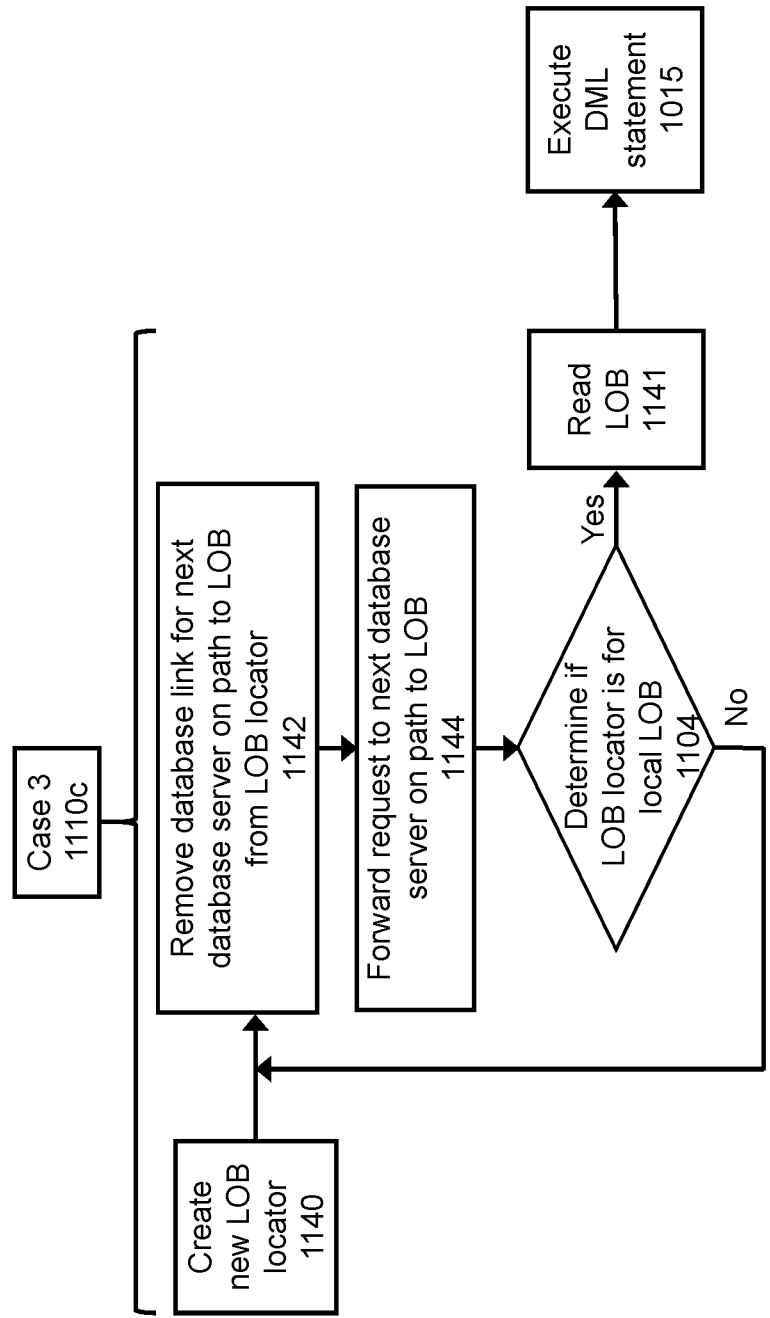
FIG. 11F is a flow chart for processing a request to execute a DML statement directed to a local table and specifying a LOB bind variable corresponding to a remote LOB locator according to some embodiments of the invention.

FIG. 11F is a flow chart for processing a request to execute a DML statement directed to a local table and specifying a LOB bind variable corresponding to a remote LOB locator according to some embodiments of the invention. In some embodiments, the steps may be performed in an order different from that described in FIG. 11F. Some of the steps illustrated in the flowchart are optional in different embodiments.

Figure 11G:
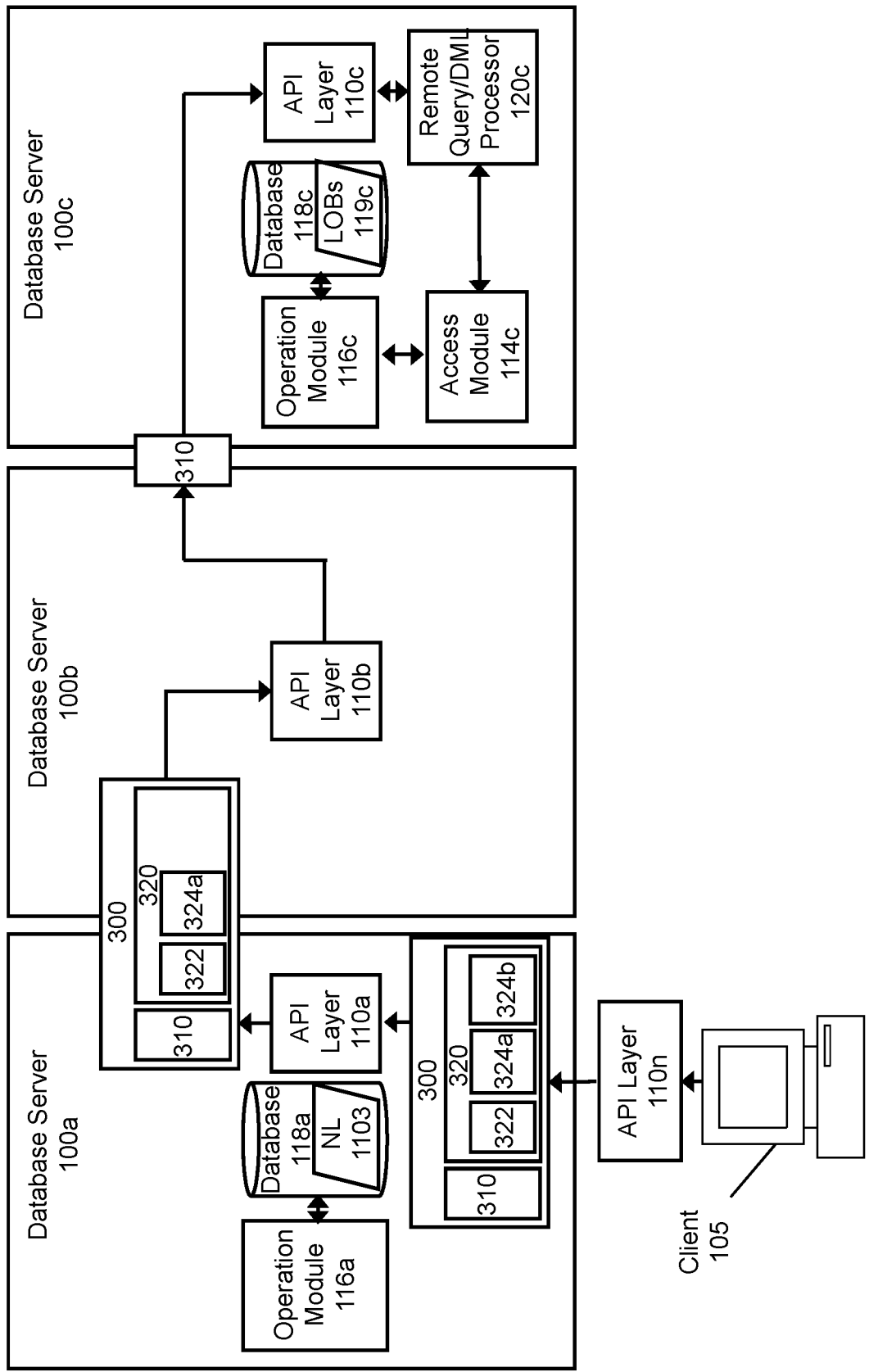
FIG. 11G illustrates an example of forwarding a request to execute a DML statement directed to a local table and specifying a LOB bind variable corresponding to a remote LOB locator according to some embodiments of the invention.

Finally, suppose the client 105 issues a request to execute the following DML statement: "INSERT INTO foo VALUES (:a);" in which "foo" is a local table and ":a" is a LOB bind variable that corresponds to a remote LOB locator 300 that may be generically represented as "LL@db1@db2 . . . @dbN," giving rise to case 3 1110*c*. As illustrated in FIGS. 11F and 11G, upon determining that case 3 1110*c* has arisen, the access module 114*a* may forward the DML statement to the operation module 116*a*, which may create 1140 a new LOB locator 1103 (e.g., generically represented as "NL") that is local to database 118*a* and which is inserted into database 118*a*.

The remote query/DML processor 120*a* at database server 100*a* may issue a request to perform a READ operation on the LOB 119 based on the remote LOB locator 300 ("LL@db1@db2 . . . @dbN") corresponding to the LOB bind variable. The remote query/DML processor 120*a* may examine a database link 324 (e.g., the last database link 324 "dbN") of the remote LOB locator 300 and identify a connection between the local database server 100*a* and a remote database server 100 to which the database link 324 refers and forward 1144 the request to perform the READ operation to the database server 100 (e.g., by identifying an existing connection from a connection pool or by opening a new connection) after removing 1142 the database link 324 (e.g., "dbN") from the remote LOB locator 300. This process may be repeated at each database server 100 on the path to the LOB 119 upon determining 1104 that the LOB bind variable is not for a local LOB 119.

Figure 11H:
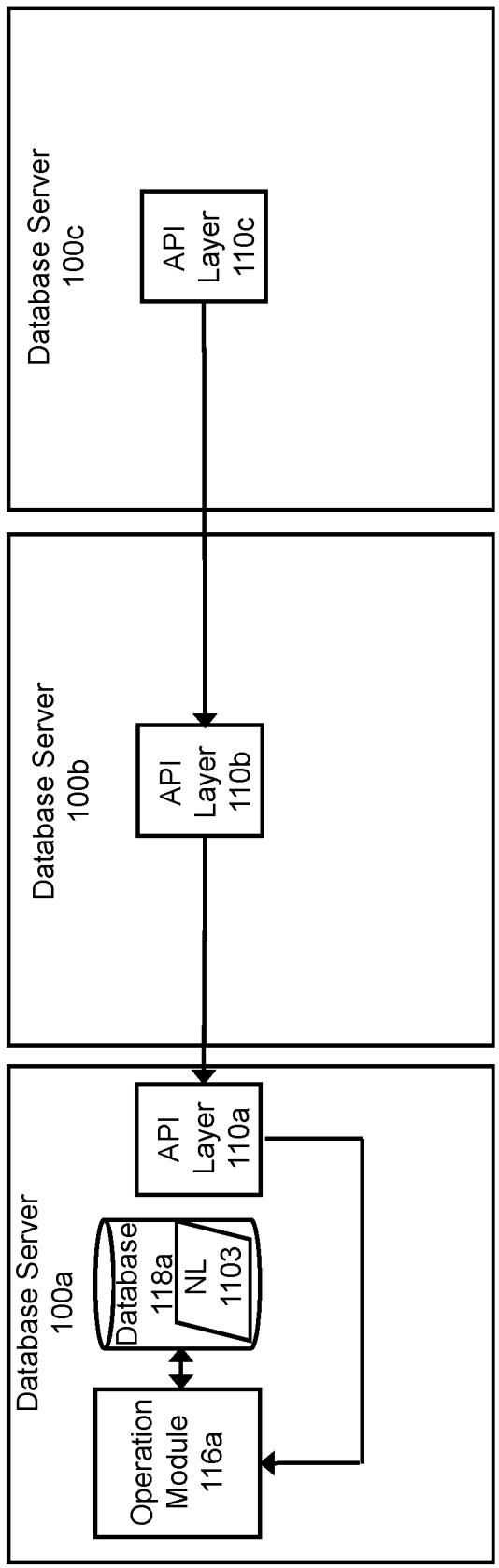
FIG. 11H illustrates an example of returning a result of a request to execute a DML statement directed to a local table and specifying a LOB bind variable corresponding to a remote LOB locator according to some embodiments of the invention.

Once the local LOB locator 310 arrives at the database server 100 at which the LOB 119 is stored (i.e., the database link information 320 has been removed from the remote LOB locator 300 corresponding to the LOB bind variable), the access module 114 at that database server 100 determines 1104 that the remote LOB locator 300 is for a local LOB 119 and the READ operation may be performed 1141 at the database server 100. The DML statement may then be executed 1015 at the local database server 100*a* at which the request was received 1005. As illustrated in FIGS. 11G-11H, the operation module 116c at the database server 100c at which the LOB 119c is stored may perform 1141 the READ operation and return the requested data upstream to the local database server 100a. The operation module 116a at the local database server 100a may then execute 1015 the DML statement by populating the new LOB locator 1103 "NL" with the data.

System Architecture

Figure 12:
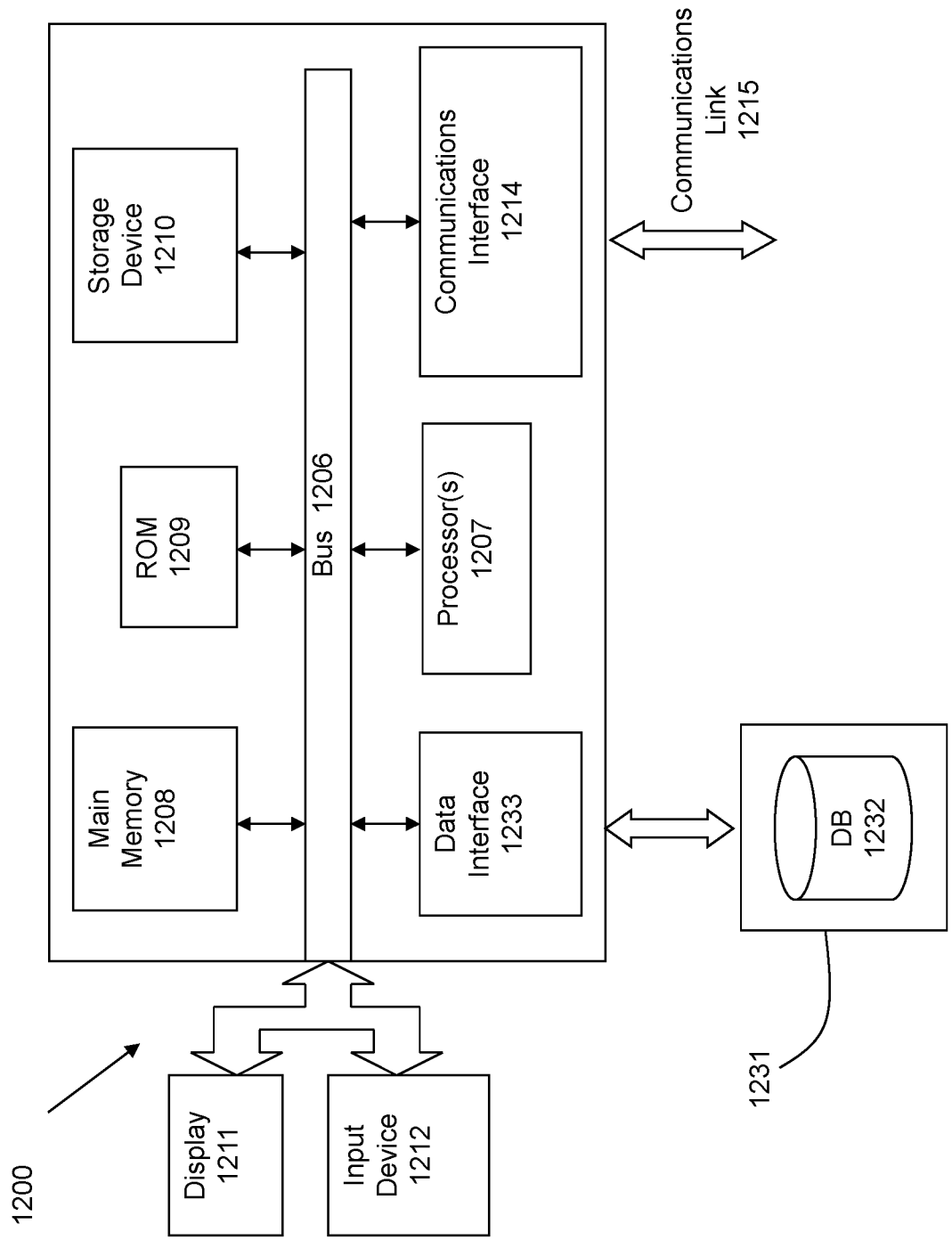
FIG. 12 is a block diagram of a computing system suitable for implementing an embodiment of the present invention.

FIG. 12 is a block diagram of an illustrative computing system 1200 suitable for implementing an embodiment of the present invention. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to some embodiments of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1210 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. A database 1232 in a storage medium 1231 may be used to store data accessible by the system 1200.

The techniques described may be implemented using various processing systems, such as clustered computing systems and cloud computing systems. In some embodiments, some or all of the distributed database system described above may be part of a cloud computing system. Cloud computing systems may implement cloud computing services, including cloud communication, cloud storage, and cloud processing.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for performing operations on large objects (LOBs) in a distributed database that includes at least a client and one or more database servers, the method comprising:

receiving a query from the client at a database server of the one or more database servers, wherein the distributed database is distributed as at least a first portion of the distributed database and at least a second portion of the distributed database, the query specifying access to a column of at least a second portion of the distributed database, and the column comprises a LOB;

in response to receipt of the query, creating, at the database server, a remote LOB locator at least by combining a local LOB locator, a database link count, and one or more database links, the one or more database links corresponding to one or more remote database servers of the one or more database servers, the local LOB locator points to a location at which the LOB is stored in the at least the second portion of the distributed database and the database link count specifies a number of the one or more database links in the remote LOB locator;

sending the remote LOB locator to the client;

after sending the remote LOB locator to the client, receiving the remote LOB locator in a request from the client to perform an operation that accesses data in the LOB;

forwarding the request to the at least the second portion of the distributed database based at least in part on the remote LOB locator; and performing the operation that accesses the data in the LOB stored in the at least the second portion of the distributed database.

2. The method of claim 1, wherein the one or more database servers comprise a local database server, a remote database server on which the LOB is stored, and one or more additional remote database servers, the remote LOB locator further comprises one or more additional database links that respectively connect the local database server hosting the at least the first portion of the distributed database to the remote database server through the one or more additional remote database servers that respectively host at least a respective portion of the distributed database, each of the one or more additional database links is respectively associated with each of the one or more additional remote database servers and is appended to the local LOB locator, and the at least the first portion or the at least the second portion comprises the distributed database in its entirety or a smaller partition of the distributed database.

3. The method of claim 1, wherein the request to perform the operation comprises randomly updating the data for the LOB at any offset at least by performing a write operation for a provided number of characters or bytes from a location.

4. The method of claim 1, further comprising:
retrieving at least a portion of the LOB from the at least the second portion of the distributed database at a remote database server, wherein the one or more database servers comprise at least the remote database server; and
forwarding the at least the portion of the LOB and the remote LOB locator to the client.

5. The method of claim 1, wherein the one or more database servers comprise a local database server corresponding to the client and one or more remote database servers, the distributed database is sharded into multiple sharded tables that are different from each other, and the multiple sharded tables are distributed across the local database server and the one or more remote database servers.

6. The method of claim 1, wherein the one or more database servers comprise a local database server corresponding to the client and a remote database server, and the remote LOB locator further comprises information describing a character set used to store the LOB at the remote database server.

7. The method of claim 1, further comprising:
returning a set of results of the query to the client, wherein the one or more database servers comprise a local database server corresponding to the client and a remote database server, and only a single character set conversion is performed to convert the set of results to a character set used by the client, wherein the remote database server that stores at least a part of the LOB uses a plurality of character sets.

8. The method of claim 1, wherein the one or more database servers comprise a local database server corresponding to the client and a plurality of remote database servers that further comprises a remote database server, and the request to perform the operation is forwarded to the remote database server via a connection that is selected from a pool of connections between the local database server and the plurality of remote database servers.

9. The method of claim 1, wherein the request to perform the operation comprises a DML (data manipulation language) statement in which the remote LOB locator or the local LOB locator is passed as a bind variable.

10. The method of claim 1, wherein the one or more database servers comprise a local database server corresponding to the client and a remote database server, and the database link associated with the remote database server comprises one or more of: information identifying a user, information identifying the database link, or information describing a length of the information identifying the database link.

11. The method of claim 2, wherein forwarding the request to perform the operation comprises:
forwarding the request to perform the operation from the client to the local database server that stores thereupon the at least the first portion of the distributed database;
forwarding the request to perform the operation from the local database server to the one or more additional remote database servers based at least in part on the one or more additional database links comprising the remote LOB locator, wherein the remote LOB locator comprises a database link count that indicate a total number of servers that are to be traversed to reach the LOB; and
forwarding the request to perform the operation from the one or more additional remote database servers to a remote database server of the one or more database servers based at least in part on the database link associated with the remote database server, wherein the operation comprises a random access to the data in the column for the LOB.

12. The method of claim 11, wherein forwarding the request to perform the operation comprises:
removing, at each of the one or more additional remote database servers, a first database link associated with the remote database server to which the request to perform the operation is being forwarded.

13. The method of claim 2, wherein an order in which the one or more additional database links associated with the one or more additional remote database servers are appended to the local LOB locator is determined based at least in part on a plurality of connections between the one or more additional remote database servers, the local database server, and the remote database server.

14. The method of claim 13, wherein the request to perform the operation comprises an offset-based access or a random access to the LOB and is forwarded to the remote database server based at least in part on the order in which the one or more additional database links associated with the one or more additional remote database servers are appended to the local LOB locator.

15. The method of claim 3, wherein the at least the first portion of the distributed database comprises an instance of the distributed database in its entirety and serves as a primary database, the at least the second portion of the distributed database comprises an identical instance of the distributed database in its entirety and serves as a standby database for the primary database, and wherein performing the operation on the LOB stored in the distributed database at the remote database server comprises:
initiating a request to perform a READ operation on the LOB and each of one or more additional LOBs, the request initiated at a last common remote database server on a path from the client to the LOB and the one or more additional LOBs, wherein the one or more database servers comprise at least the last common remote database server and one or more remote database servers;
forwarding the READ operation from the last common remote database server to the one or more remote database servers at which the LOB and the one or more additional LOBs are located;
processing the request to perform the READ operation on the LOB and each of the one or more additional LOBs at the one or more remote database servers;
receiving, at the last common remote database server, a result of the request to perform the READ operation on the LOB and each of the one or more additional LOBs;
performing a comparison of the result of the request to perform the READ operation on the LOB and each of the one or more additional LOBs; and
returning an additional result of the comparison to the client.

16. The method of claim 5, wherein the local database server communicates the request to perform the operation to a plurality of shards that are determined by sharding the distributed database and are distributed across the local database server and the one or more remote database servers, at least one of the plurality of shards comprising the LOB.

17. The method of claim 9, wherein the one or more database servers comprise a local database server corresponding to the client and a remote database server, and the DML statement is directed to a remote table stored on the remote database server or a local table stored on the local database server.

18. A computer program product embodied on a non-transitory computer readable medium having stored thereon a sequence of instructions which, when executed by a processor, causes a set of acts for performing operations on large objects (LOBs) in a distributed database that includes at least a client and one or more database servers, the set of acts comprising:
    receiving a query from the client at a database server of the one or more database servers, wherein the distributed database is distributed as at least a first portion of the distributed database and at least a second portion of the distributed database, the query specifying access to a column of at least a second portion of the distributed database, and the column comprises a LOB;
    in response to receipt of the query, creating, at the database server, a remote LOB locator at least by combining a local LOB locator, a database link count, and one or more database links, the one or more database links corresponding to one or more remote database servers of the one or more database servers, the local LOB locator points to a location at which the LOB is stored in the at least the second portion of the distributed database and the database link count specifies a number of the one or more database links in the remote LOB locator;
    sending the remote LOB locator to the client;
    after sending the remote LOB locator to the client, receiving the remote LOB locator in a request from the client to perform an operation that accesses data in the LOB;
    forwarding the request to the at least the second portion of the distributed database based at least in part on the remote LOB locator; and
    performing the operation that accesses the data in the LOB stored in the at least the second portion of the distributed database.

19. The computer program product of claim 18, wherein the one or more database servers comprise a local database server, a remote database server on which the LOB is stored, and one or more additional remote database servers, the remote LOB locator further comprises one or more additional database links that respectively connect the local database server hosting the at least the first portion of the distributed database to the remote database server through the one or more additional remote database servers that respectively host at least a respective portion of the distributed database, each of the one or more additional database links is respectively associated with each of the one or more additional remote database servers and is appended to the local LOB locator, and the at least the first portion or the at least the second portion comprises the distributed database in its entirety or a smaller partition of the distributed database.

20. The computer program product of claim 18, wherein the set of acts for the request to perform the operation comprise randomly updating the data for the LOB at any offset at least by performing a write operation for a provided number of characters or bytes from a location.

21. The computer program product of claim 18, wherein the set of acts further comprise:
    retrieving at least a portion of the LOB from the at least the second portion of the distributed database at a remote database server, wherein the one or more database servers comprise at least the remote database server; and
    forwarding the at least the portion of the LOB and the remote LOB locator to the client.

22. The computer program product of claim 18, wherein the one or more database servers comprise a local database server corresponding to the client and one or more remote database servers, the distributed database is sharded into multiple sharded tables that are different from each other, and the multiple sharded tables are distributed across the local database server and the one or more remote database servers.

23. The computer program product of claim 18, wherein the one or more database servers comprise a local database server corresponding to the client and a remote database server, and the remote LOB locator further comprises information describing a character set used to store the LOB at the remote database server.

24. The computer program product of claim 18, wherein the one or more database servers comprise a local database server corresponding to the client and a plurality of remote database servers that further comprises a remote database server, and the request to perform the operation is forwarded to the remote database server via a connection that is selected from a pool of connections between the local database server and the plurality of remote database servers.

25. The computer program product of claim 18, wherein the request to perform the operation comprises a DML (data manipulation language) statement in which the remote LOB locator or the local LOB locator is passed as a bind variable.

26. The computer program product of claim 18, wherein the one or more database servers comprise a local database server corresponding to the client and a remote database server, and the database link associated with the remote database server comprises one or more of: information identifying a user, information identifying the database link, or information describing a length of the information identifying the database link.

27. The computer program product of claim 19, wherein the set of acts for forwarding the request to perform the operation comprise:
    forwarding the request to perform the operation from the client to the local database server that stores thereupon the at least the first portion of the distributed database;
    forwarding the request to perform the operation from the local database server to the one or more additional remote database servers based at least in part on the one or more additional database links comprising the remote LOB locator, wherein the remote LOB locator comprises a database link count that indicate a total number of servers that are to be traversed to reach the LOB; and
    forwarding the request to perform the operation from the one or more additional remote database servers to a remote database server of the one or more database servers based at least in part on the database link associated with the remote database server, wherein the operation comprises a random access to the data in the column for the LOB.

28. The computer program product of claim 27, wherein the set of acts for forwarding the request to perform the operation further comprise:
    removing, at each of the one or more additional remote database servers, a first database link associated with the remote database server to which the request to perform the operation is being forwarded.

29. The computer program product of claim 19, wherein an order in which the one or more additional database links associated with the one or more additional remote database servers are appended to the local LOB locator is determined based at least in part on a plurality of connections between the one or more additional remote database servers, the local database server, and the remote database server.

30. The computer program product of claim 29, wherein the set of acts for the request to perform the operation comprise an offset-based access or a random access to the LOB and is forwarded to the remote database server based at least in part on the order in which the one or more additional database links associated with the one or more additional remote database servers are appended to the local LOB locator.

31. The computer program product of claim 20, wherein the at least the first portion of the distributed database comprises an instance of the distributed database in its entirety and serves as a primary database, the at least the second portion of the distributed database comprises an identical instance of the distributed database in its entirety and serves as a standby database for the primary database, and wherein the set of acts for performing the operation on the LOB stored in the distributed database at the remote database server comprise:
    initiating a request to perform a READ operation on the LOB and each of one or more additional LOBs, the request initiated at a last common remote database server on a path from the client to the LOB and the one or more additional LOBs, wherein the one or more database servers comprise at least the last common remote database server and one or more remote database servers;
    forwarding the READ operation from the last common remote database server to one or more remote database servers at which the LOB and the one or more additional LOBs are located;
    processing the request to perform the READ operation on the LOB and each of the one or more additional LOBs at the one or more remote database servers;
    receiving, at the last common remote database server, a result of the request to perform the READ operation on the LOB and each of the one or more additional LOBs;
    performing a comparison of the result of the request to perform the READ operation on the LOB and each of the one or more additional LOBs; and
    returning an additional result of the comparison to the client.

32. The computer program product of claim 22, wherein the local database server communicates the request to perform the operation to a plurality of shards that are determined by sharding the distributed database and are distributed across the local database server and the one or more remote database servers, at least one of the plurality of shards comprising the LOB.

33. The computer program product of claim 23, wherein the set of acts further comprise:
    returning a set of results of the query to the client, wherein the one or more database servers comprise a local database server corresponding to the client and a remote database server, and only a single character set conversion is performed to convert the set of results to a character set used by the client, wherein the remote database server that stores at least a part of the LOB uses a plurality of character sets.

34. The computer program product of claim 25, wherein the one or more database servers comprise a local database server corresponding to the client and a remote database server, and the DML statement is directed to a remote table stored on the remote database server or a local table stored on the local database server.

35. A computer system for performing operations on large objects (LOBs) in a distributed database that includes at least a client and one or more database servers, the computer system comprising:
    a memory for storing data and instructions; and
    a processor that executes a sequence of instructions which, when executed by the processor, causes the processor to execute a set of acts, the set of acts comprising:
        receiving a query from the client at a database server of the one or more database servers, wherein the distributed database is distributed as at least a first portion of the distributed database and at least a second portion of the distributed database, the query specifying access to a column of at least a second portion of the distributed database, and the column comprises a LOB;
        in response to receipt of the query, creating, at the database server, a remote LOB locator at least by combining a local LOB locator, a database link count, and one or more database links, the one or more database links corresponding to one or more remote database servers of the one or more database servers, the local LOB locator points to a location at which the LOB is stored in the at least the second portion of the distributed database and the database link count specifies a number of the one or more database links in the remote LOB locator;
        sending the remote LOB locator to the client;
        after sending the remote LOB locator to the client, receiving the remote LOB locator in a request from the client to perform an operation that accesses data in the LOB;
        forwarding the request to the at least the second portion of the distributed database based at least in part on the remote LOB locator; and
        performing the operation that accesses the data in the LOB stored in the at least the second portion of the distributed database.

36. The computer system of claim 35, wherein the one or more database servers comprise a local database server, a remote database server on which the LOB is stored, and one or more additional remote database servers, the remote LOB locator further comprises one or more additional database links that respectively connect the local database server hosting the at least the first portion of the distributed database to the remote database server through the one or more additional remote database servers that respectively host at least a respective portion of the distributed database, each of the one or more additional database links is respectively associated with each of the one or more additional remote database servers and is appended to the local LOB locator, and the at least the first portion or the at least the second portion comprises the distributed database in its entirety or a smaller partition of the distributed database.

37. The computer system of claim 35, wherein the set of acts for the request to perform the operation comprise randomly updating the data for the LOB at any offset at least by performing a write operation for a provided number of characters or bytes from a location.

38. The computer system of claim 35, wherein the set of acts further comprise:
    retrieving at least a portion of the LOB from the at least the second portion of the distributed database at a remote database server, wherein the one or more database servers comprise at least the remote database server; and forwarding the at least the portion of the LOB and the remote LOB locator to the client.

39. The computer system of claim 35, wherein the one or more database servers comprise a local database server corresponding to the client and one or more remote database servers, the distributed database is sharded into multiple sharded tables that are different from each other, and the multiple sharded tables are distributed across the local database server and the one or more remote database servers.

40. The computer system of claim 35, wherein the one or more database servers comprise a local database server corresponding to the client and a remote database server, and the remote LOB locator further comprises information describing a character set used to store the LOB at the remote database server.

41. The computer system of claim 35, wherein the one or more database servers comprise a local database server corresponding to the client and a plurality of remote database servers that further comprises a remote database server, and the request to perform the operation is forwarded to the remote database server via a connection that is selected from a pool of connections between the local database server and the plurality of remote database servers.

42. The computer system of claim 35, wherein the request to perform the operation comprises a DML (data manipulation language) statement in which the remote LOB locator or the local LOB locator is passed as a bind variable.

43. The computer system of claim 35, wherein the one or more database servers comprise a local database server corresponding to the client and a remote database server, and the database link associated with the remote database server comprises one or more of: information identifying a user, information identifying the database link, or information describing a length of the information identifying the database link.

44. The computer system of claim 36, wherein the set of acts for forwarding the request to perform the operation comprise:
    forwarding the request to perform the operation from the client to the local database server that stores thereupon the at least the first portion of the distributed database;
    forwarding the request to perform the operation from the local database server to the one or more additional remote database servers based at least in part on the one or more additional database links comprising the remote LOB locator, wherein the remote LOB locator comprises a database link count that indicate a total number of servers that are to be traversed to reach the LOB; and
    forwarding the request to perform the operation from the one or more additional remote database servers to a remote database server of the one or more database servers based at least in part on the database link associated with the remote database server, wherein the operation comprises a random access to the data in the column for the LOB.

45. The computer system of claim 44, wherein the set of acts for forwarding the request to perform the operation comprise:
    removing, at each of the one or more additional remote database servers, a first database link associated with the remote database server to which the request to perform the operation is being forwarded.

46. The computer system of claim 36, wherein an order in which the one or more additional database links associated with the one or more additional remote database servers are appended to the local LOB locator is determined based at least in part on a plurality of connections between the one or more additional remote database servers, the local database server, and the remote database server.

47. The computer system of claim 46, wherein the set of acts for the request to perform the operation comprise an offset-based access or a random access to the LOB and is forwarded to the remote database server based at least in part on the order in which the one or more additional database links associated with the one or more additional remote database servers are appended to the local LOB locator.

48. The computer system of claim 37, wherein the at least the first portion of the distributed database comprises an instance of the distributed database in its entirety and serves as a primary database, the at least the second portion of the distributed database comprises an identical instance of the distributed database in its entirety and serves as a standby database for the primary database, and wherein the set of acts for performing the operation on the LOB stored in the distributed database at the remote database server comprise:
    initiating a request to perform a READ operation on the LOB and each of one or more additional LOBs, the request initiated at a last common remote database server on a path from the client to the LOB and the one or more additional LOBs, wherein the one or more database servers comprise at least the last common remote database server and one or more remote database servers;
    forwarding the READ operation from the last common remote database server to one or more remote database servers at which the LOB and the one or more additional LOBs are located;
    processing the request to perform the READ operation on the LOB and each of the one or more additional LOBs at the one or more remote database servers;
    receiving, at the last common remote database server, a result of the request to perform the READ operation on the LOB and each of the one or more additional LOBs;
    performing a comparison of the result of the request to perform the READ operation on the LOB and each of the one or more additional LOBs; and
    returning an additional result of the comparison to the client.

49. The computer system of claim 39, wherein the local database server communicates the request to perform the operation to a plurality of shards that are determined by sharding the distributed database and are distributed across the local database server and the one or more remote database servers, at least one of the plurality of shards comprising the LOB.

50. The computer system of claim 40, wherein the set of acts further comprise:
    returning a set of results of the query to the client, wherein the one or more database servers comprise a local database server corresponding to the client and a remote database server, and only a single character set conversion is performed to convert the set of results to a character set used by the client, wherein the remote database server that stores at least a part of the LOB uses a plurality of character sets.

51. The computer system of claim 42, wherein the one or more database servers comprise a local database server corresponding to the client and a remote database server, and the DML statement is directed to a remote table stored on the remote database server or a local table stored on the local database server.

* * * * *